US012625274B2

(12) United States Patent
Sengupta et al.

(10) Patent No.: US 12,625,274 B2
(45) Date of Patent: May 12, 2026

(54) GLOBAL NAVIGATION SATELLITE SYSTEM (GNSS) POSITION ACQUISITION IN CONNECTED MODE

(71) Applicant: QUALCOMM Incorporated, San Diego, CA (US)

(72) Inventors: Ayan Sengupta, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 18/448,073

(22) Filed: Aug. 10, 2023

(65) Prior Publication Data

US 2024/0053484 A1 Feb. 15, 2024

Related U.S. Application Data

(60) Provisional application No. 63/371,320, filed on Aug. 12, 2022.

(51) Int. Cl.
| | |
|---|---|
| *G01S 19/07* | (2010.01) |
| *H04W 64/00* | (2009.01) |
| *H04W 76/14* | (2018.01) |

(52) U.S. Cl.
CPC ........... *G01S 19/07* (2013.01); *H04W 64/003* (2013.01); *H04W 76/14* (2018.02)

(58) Field of Classification Search
CPC .......... G01S 19/07; G01S 19/21; G01S 19/25; H04W 76/14; H04W 64/003;
(Continued)

(56) References Cited

U.S. PATENT DOCUMENTS

2023/0127817 A1* 4/2023 Lee ....................... H04W 64/00
                                                        370/329
2023/0350081 A1* 11/2023 Wu ........................... G01S 5/01
(Continued)

FOREIGN PATENT DOCUMENTS

WO 2021133239 A1 7/2021

OTHER PUBLICATIONS

Apple: "On Improved GNSS Operations for IoT NTN", 3GPP TSG RAN WG1 #109-e, R1-2204269, 3rd Generation Partnership Project, Mobile Competence Centre, 650, Route Des Lucioles, F-06921 Sophia-Antipolis Cedex, France, vol. Ran WG1, No. e-Meeting, May 9, 2022-May 20, 2022, Apr. 29, 2022, pp. 1-2, XP052153450, The Whole Document.
Ericsson: "On UL Time and Frequency Synchronization Enhancements for Ntn", 3GPP TSG-RAN WG1 Meeting #102-e, R1-2005502, 3rd Generation Partnership Project, Mobile Competence Centre, 650, Route Des Lucioles, F-06921, Sophia-Antipolis Cedex, France, vol. RAN WG1, No. e-Meeting, Aug. 17, 2020-Aug. 28, 2020, Aug. 7, 2020, pp. 1-13, XP051917511, Section 3-5.
(Continued)

*Primary Examiner* — Hirdepal Singh
(74) *Attorney, Agent, or Firm* — Harrity & Harrity, LLP

(57) ABSTRACT

Wireless communication devices, systems, and methods related to global navigation satellite system (GNSS) position acquisition during connected mode, including associated protocols and signaling, are provided. For example, a method of wireless communication performed by a user equipment (UE) can include transmitting, to a non-terrestrial network unit, a capability indication, the capability indication indicating the UE is capable of performing a global navigation satellite system (GNSS) position acquisition during a connected mode connection; receiving, from the non-terrestrial network unit, an indication of whether the non-terrestrial network unit will support the UE performing the GNSS position acquisition during the connected mode connection; and performing, based at least in part on the receiving the indication, the GNSS position acquisition during the connected mode connection with the non-terrestrial network unit.

22 Claims, 13 Drawing Sheets

(58) Field of Classification Search
CPC ..... H04W 64/00; H04W 76/12; H04W 76/18;
H04W 76/27; H04W 8/24; H04W 84/06;
H04B 7/1851; H04B 7/18519
USPC ...................................................... 455/456.6
See application file for complete search history.

(56) References Cited

U.S. PATENT DOCUMENTS

| | | | | |
|---|---|---|---|---|
| 2024/0022984 | A1* | 1/2024 | Åström | ............... H04B 7/18541 |
| 2024/0406919 | A1* | 12/2024 | Niu | ........................ H04W 64/00 |
| 2025/0211995 | A1* | 6/2025 | Lauridsen | ............... H04W 4/02 |

OTHER PUBLICATIONS

Mediatek Inc: "Improved GNSS Operations for IoT NTN", 3GPP
TSG RAN WG1 Meeting #109-e, R1-2203391, 3rd Generation
Partnership Project, Mobile Competence Centre, 650, Route Des
Lucioles, F-06921 Sophia-Antipolis Cedex, France, Apr. 29, 2022,
6 Pages, XP052152968, The Whole Document.
Partial International Search Report - PCT/US2023/030095—ISA/
EPO—Dec. 15, 2023.
International Search Report and Written Opinion—PCT/US2023/
030095—ISA/EPO—Feb. 5, 2024.

* cited by examiner

300

105

115

1000

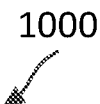

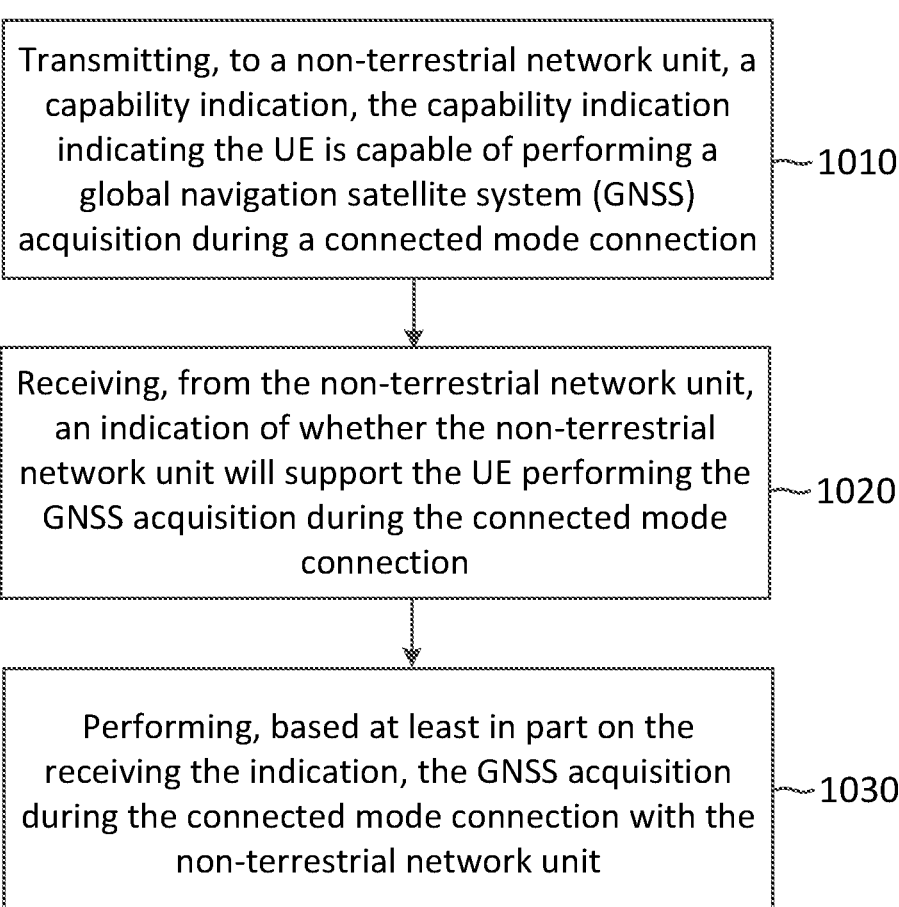

Transmitting, to a non-terrestrial network unit, a capability indication, the capability indication indicating the UE is capable of performing a global navigation satellite system (GNSS) acquisition during a connected mode connection ~1010

Receiving, from the non-terrestrial network unit, an indication of whether the non-terrestrial network unit will support the UE performing the GNSS acquisition during the connected mode connection ~1020

Performing, based at least in part on the receiving the indication, the GNSS acquisition during the connected mode connection with the non-terrestrial network unit ~1030

Receiving, from a user equipment (UE), a capability indication, the capability indication indicating the UE is capable of performing a global navigation satellite system (GNSS) acquisition during a connected mode connection ⸺1110

Transmit, to the UE, an indication of whether the non-terrestrial network unit will support the UE performing the GNSS acquisition during the connected mode connection ⸺1120

FIG. 11

1300
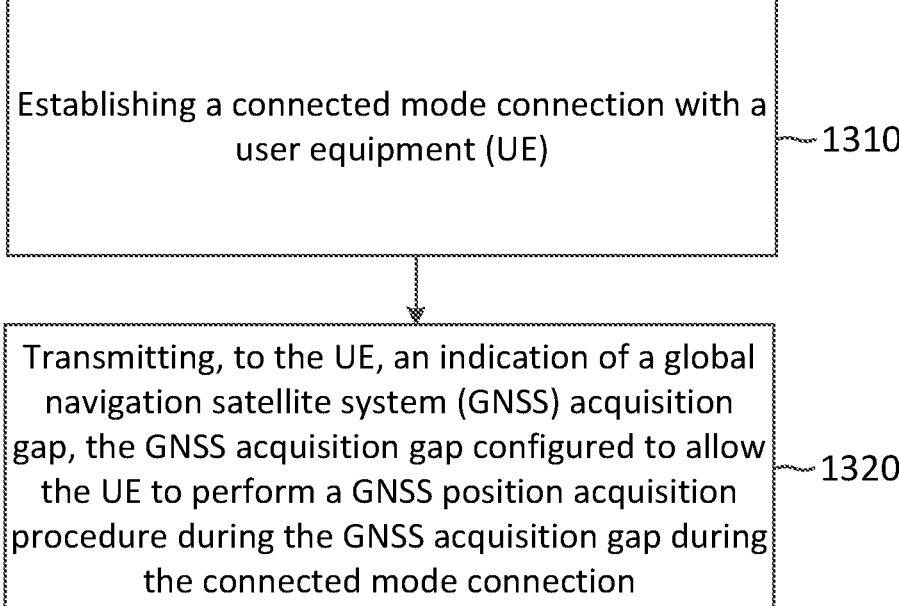
Establishing a connected mode connection with a user equipment (UE) — 1310
Transmitting, to the UE, an indication of a global navigation satellite system (GNSS) acquisition gap, the GNSS acquisition gap configured to allow the UE to perform a GNSS position acquisition procedure during the GNSS acquisition gap during the connected mode connection — 1320
FIG. 13

GLOBAL NAVIGATION SATELLITE SYSTEM (GNSS) POSITION ACQUISITION IN CONNECTED MODE

CROSS-REFERENCE TO RELATED APPLICATIONS

The present application claims priority to and the benefit of U.S. Provisional Patent Application No. 63/371,320, filed Aug. 12, 2022, which is hereby incorporated by reference in its entirety as if fully set forth below and for all applicable purposes.

TECHNICAL FIELD

This application relates to wireless communication systems, and more particularly to methods—and associated devices and systems—for global navigation satellite system (GNSS) position acquisition during connected mode, including associated protocols and signaling.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHZ to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Some wireless communications systems may support non-terrestrial networks, which may provide broad coverage areas by using high-altitude vehicles (e.g., satellites or other non-terrestrial-based high-altitude equipment) between base stations and UEs and/or by having base stations on board of the high-altitude vehicles (e.g., satellites). The use of high-altitude vehicles provides benefits and challenges for different aspects of wireless communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a user equipment (UE) includes transmitting, to a non-terrestrial network unit, a capability indication, the capability indication indicating the UE is capable of performing a global navigation satellite system (GNSS) acquisition during a connected mode connection; receiving, from the non-terrestrial network unit, an indication of whether the non-terrestrial network unit will support the UE performing the GNSS position acquisition during the connected mode connection; and performing, based at least in part on the receiving the indication, the GNSS position acquisition during the connected mode connection with the non-terrestrial network unit. Associated devices, systems, means, and/or non-transitory computer readable media having one or more instructions executable by one or more processors of a UE are also provided.

In an additional aspect of the disclosure, a method of wireless communication performed by a non-terrestrial network unit includes receiving, from a user equipment (UE), a capability indication, the capability indication indicating the UE is capable of performing a global navigation satellite system (GNSS) acquisition during a connected mode connection; and transmitting, to the UE, an indication of whether the non-terrestrial network unit will support the UE performing the GNSS position acquisition during the connected mode connection Associated devices, systems, means, and/or non-transitory computer readable media having one or more instructions executable by one or more processors of a network unit are also provided.

In an aspect of the disclosure, a method of wireless communication performed by a user equipment (UE) includes establishing a connected mode connection with a non-terrestrial network unit; receiving, from the non-terrestrial network unit, an indication of a global navigation satellite system (GNSS) acquisition gap; and performing, during the connected mode connection with the non-terrestrial network unit, a GNSS position acquisition during the GNSS position acquisition gap Associated devices, systems, means, and/or non-transitory computer readable media having one or more instructions executable by one or more processors of a UE are also provided.

In an additional aspect of the disclosure, a method of wireless communication performed by a non-terrestrial network unit includes establishing a connected mode connection with a user equipment (UE); and transmitting, to the UE, an indication of a global navigation satellite system (GNSS) acquisition gap, the GNSS position acquisition gap configured to allow the UE to perform a GNSS position acquisition during the GNSS position acquisition gap during the connected mode connection Associated devices, systems, means, and/or non-transitory computer readable media having one or more instructions executable by one or more processors of a network unit are also provided.

Other aspects and features of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects, it should be understood that such exemplary aspects can be implemented in various devices, systems, and methods.

BRIEF DESCRIPTION OF THE DRAWINGS

FIG. 10 illustrates a flow diagram of a wireless communication method according to some aspects of the present disclosure.

FIG. 11 illustrates a flow diagram of a wireless communication method according to some aspects of the present disclosure.

FIG. 13 illustrates a flow diagram of a wireless communication method according to some aspects of the present disclosure.

DETAILED DESCRIPTION

Figure 1:
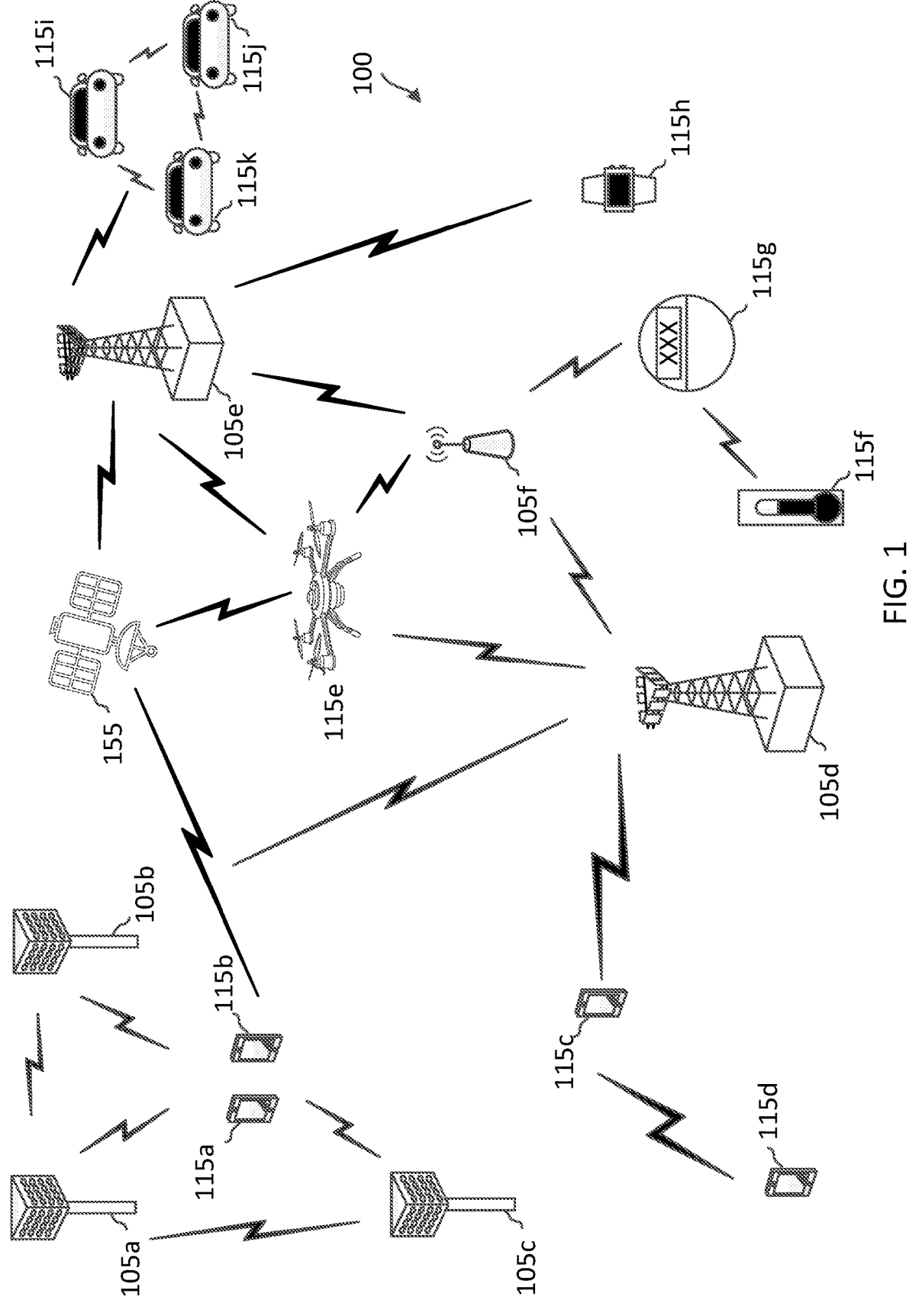
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communication networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For instance, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For instance, in various outdoor and macro coverage deployments of less than 3 GHz FDD/TDD implementations, subcarrier spacing may occur with 15 kHz, for instance over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For instance, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For instance, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For instance, a method may be implemented as part of a system, device, apparatus, and/or as instructions stored on a computer readable medium for execution on a processor or computer. Furthermore, an aspect may comprise at least one element of a claim.

Aspects of the present disclosure allow a UE to perform global navigation satellite system (GNSS) position acquisition during a connected mode connection with a non-terrestrial network unit. In this regard, the performance of GNSS position acquisition during the connected mode connection can allow for prolonged connections between the UE and the non-terrestrial network unit. The prolonged connections can be used to provide additional functionality and/or power savings to the UE and/or the non-terrestrial network unit through the use of techniques like connected mode discontinuous reception (C-DRX) and/or other techniques. Further, the prolonged connections can avoid the power consumption and network resources required to repeatedly establish a connected mode connection between the UE and the non-terrestrial network unit. Current systems expect a UE to enter an idle mode after the validity of a GNSS position expires and, therefore, any connected mode connection is limited by the validity of the GNSS position. As a result, the UE must repeatedly reconnect with the non-terrestrial network unit upon the expiration of each GNSS position. As described herein, in addition to the prolonged connections and coordination between the UE and the non-terrestrial network unit aspects of the present disclosure related to performing GNSS position acquisition during a connected mode connection also provide improved network efficiency, improved allocation of network resources, reduced power consumption by the UEs and/or the non-terrestrial network units, and/or backwards compatibility (e.g., between UEs and/or non-terrestrials network units supporting and/or not supporting GNSS position acquisition during a connected mode connection).

FIG. 1 illustrates a wireless communication network 100 according to one or more aspects of the present disclosure. The network 100 may be a 5G network. The network 100 includes a number of BSs 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

In some aspects, the term "base station" (e.g., the BS 105) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the BSs 105. In some aspects, the term "base station" or "network entity" may refer to a plurality of devices configured to perform the one or more functions. For example, in some distributed systems, each of a number of different devices (which may be located in the same geographic location or in different geographic locations) may be con-figured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The network 100 may support synchronous or asynchro-nous operation. For synchronous operation, the BSs may have similar frame timing, and transmissions from different BSs may be approximately aligned in time. For asynchro-nous operation, the BSs may have different frame timing, and transmissions from different BSs may not be aligned in time.

The UEs 115 are dispersed throughout the wireless net-work 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are instances of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are instances of various machines configured for communication that access the network 100. The UEs 115i-115k are instances of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform back-haul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an instance of a gNB or an access node controller (ANC)) may interface with the core network through backhaul links (e.g., NG-C, NG-U, etc.) and may perform radio configuration and scheduling for communication with the UEs 115. In various cases, the BSs 105 may communicate, either directly or indirectly (e.g., through core network), with each other over backhaul links (e.g., X1, X2, etc.), which may be wired or wireless communication links.

The network 100 may also support mission critical com-munications with ultra-reliable and redundant links for mis-sion critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communi-cating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for instance, about 10. Each slot may be further divided into mini-slots. In a FDD mode, simultaneous UL and DL transmissions may occur in different frequency bands. For instance, each subframe includes a UL subframe in a UL frequency band and a DL subframe in a DL frequency band. In a TDD mode, UL and DL transmissions occur at different time periods using the same frequency band. For instance, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For instance, each DL or UL subframe may have pre-defined regions for transmissions of reference signals, control information, and data. Reference signals are predetermined signals that facilitate the communications between the BSs 105 and the UEs 115. For instance, a reference signal can have a particular pilot pattern or structure, where pilot tones may span across an operational BW or frequency band, each positioned at a pre-defined time and a pre-defined frequency. For instance, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some instances, the random access procedure may be a four-step random access procedure. For instance, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some instances, the random access preamble, the RAR, the connection request, and the connection response can be referred to as message 1 (MSG1), message 2 (MSG2), message 3 (MSG3), and message 4 (MSG4), respectively. In some instances, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For instance, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In some aspects, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For instance, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for instance, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). After receiving the DL data packet, the UE 115 may transmit a feedback message for the DL data packet to the BS 105. In some instances, the UE 115 may transmit the feedback on an acknowledgment resource. The feedback may be an acknowledgement (ACK) indicating that reception of the DL data packet by the UE 115 is successful (e.g., received the DL data without error) or may be a negative-acknowledgement (NACK) indicating that reception of the DL data packet by the UE 115 is unsuccessful (e.g., including an error or failing an error correction). In some aspects, if the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For instance, the BWP pair may include one BWP for UL communications and one BWP for DL communications.

In some aspects, the network 100 may also include one or more satellites 155 (e.g., in a non-terrestrial network (NTN) configuration), which may communicate with BS s 105 or the core network via gateways (e.g., ground-based terminals, NTN gateways). Satellites 155 may also communicate with UEs 115, which may include other high altitude or terrestrial communications devices. In various examples, a satellite 155 itself may be an example of a BS 105 (e.g., supporting a gNB processed payload). In some aspects, a BS 105 aboard a satellite 155 and/or a satellite performing one or more base station functionalities may be referred to as a non-terrestrial network unit. In some aspects, a satellite 155 may provide a relay of signals between a BS 105 and UEs 115 (e.g., in a transparent satellite configuration, where a satellite 155 and a gateway may be configured together as a remote radio unit). A satellite 155 may be any suitable type of communication satellite configured to relay or otherwise support communications between different devices in the wireless communications network 100. A satellite 155 may be an example of a space satellite, a balloon, a dirigible, an airplane, a drone, an unmanned aerial vehicle, or other vehicle which may support communications from a generally non-terrestrial, overhead, or elevated position. In some examples, a satellite 155 may be in a geosynchronous or geostationary earth orbit, a low earth orbit, or a medium earth orbit. A satellite 155 may be a multi-beam satellite configured to provide service for multiple service beam coverage areas in a configured geographical service area. The satellite 155 may be any distance away from the surface of the earth or other reference surface.

Before establishing a connection with a UE 115, a BS 105 (aboard a satellite 155) may determine the approximate location of the UE 115 (e.g., so that the base station can select the appropriate core network to access on behalf of the UE 115). For example, to comply with various regulations or for other purposes, the base station may determine the country of the UE 115 so that the base station can select the core network of that country to access. To determine the approximate location of the UE 115 (and thus the country of the UE 115), a BS 105 may determine the approximate location of a UE 115 by using the propagation delay between the UE 115 and the BS 105 to determine a path along which the UE 115 is located. The BS 105 may leverage additional techniques to approximately locate the UE 115 on the path. For example, in some instances a BS 105 may determine the approximate location of a UE 115 by using a directional antenna to scan for an uplink reference signal from the UE 115. In some aspects, the BS 105 may configure communications between the UE 115 and the BS 105 based on geographic coordinates (e.g., Global Navigation Satellite System (GNSS) coordinates) reported by the UE.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
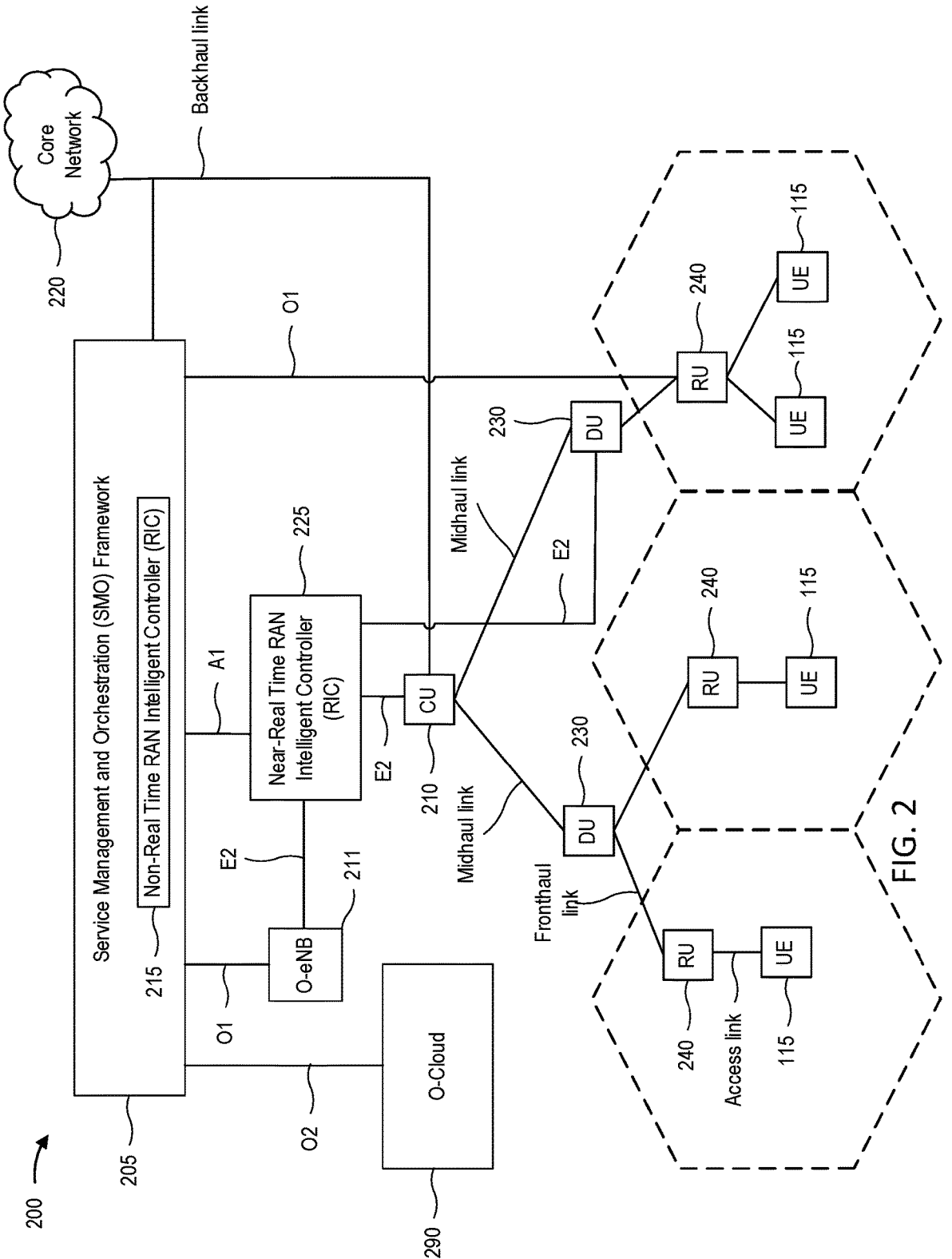
FIG. 2 illustrates a diagram of an example disaggregated base station architecture according to one or more aspects of the present disclosure.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUs 210, the DUs 230, the RUs 240, as well as the Near-RT RICs 225, the Non-RT RICs 215, and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 115. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
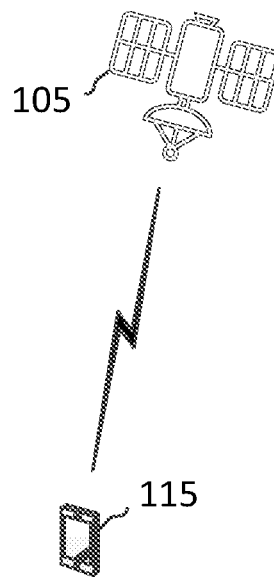
FIG. 3 illustrates a wireless communication network with a connected mode connection between a non-terrestrial network unit and a user equipment (UE) according to some aspects of the present disclosure.

FIG. 3 illustrates a wireless communication network 300 according to some aspects of the present disclosure. As shown, a UE 115 may establish a connected mode connection with a non-terrestrial network unit 105. In some instances, the UE 115 acquires an initial GNSS position as part of establishing the connected mode connection with the non-terrestrial network unit. In some instances, the UE 115 acquires an initial GNSS position separately from establishing the connected mode connection with the non-terrestrial network unit. The UE 115 may transmit an indication of the initial GNSS position and/or a validity time associated with the initial GNSS position to the network unit. In some aspects, in establishing the connected mode connection with the non-terrestrial network unit 105 the UE 115 may transmit an indication of the initial GNSS position and/or an indication of the validity time associated with the initial GNSS position to the non-terrestrial network unit 105.

Figure 4:
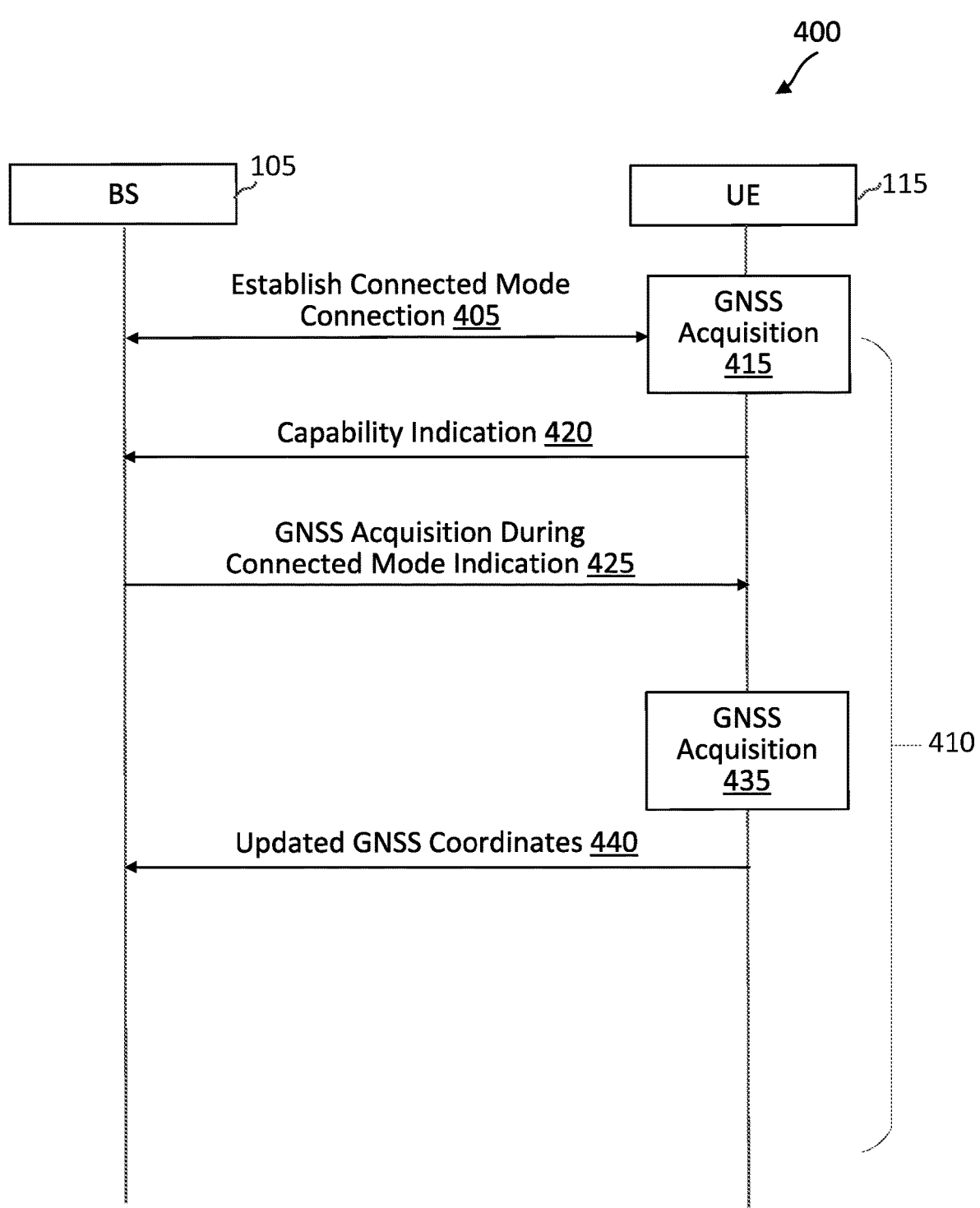
FIG. 4 illustrates a signaling diagram for a GNSS position acquisition during connected mode scheme according to some aspects of the present disclosure.

FIG. 4 illustrates a signaling diagram for a GNSS position acquisition during connected mode scheme 400 according to some aspects of the present disclosure. The GNSS position acquisition during connected mode scheme 400 illustrates aspects of performing a GNSS position acquisition during a connected mode connection in accordance with the present disclosure. In this regard, aspects of the GNSS position acquisition during connected mode scheme 400 may be utilized in the context of the wireless communication networks 100 and 300 as well as with other aspects of the present disclosure, including the GNSS position acquisition during connected mode schemes 500, 600, and 700.

As shown, at action 405, a non-terrestrial BS 105 and a UE 115 establish a connected mode connection 410. In some instances, at action 415, the UE 115 acquires an initial GNSS position as part of establishing the connected mode connection 410 with the non-terrestrial BS 105. In some instances, the UE 115 acquires an initial GNSS position separately from establishing the connected mode connection 410 with the non-terrestrial BS 105. The UE 115 may transmit an indication of the initial GNSS position and/or a validity time associated with the initial GNSS position to the non-terrestrial BS 105. In some aspects, in establishing the connected mode connection 410 with the non-terrestrial BS 105 at action 405, the UE 115 may transmit to the non-terrestrial BS 105 an indication of the initial GNSS position and/or an indication of the validity time associated with the initial GNSS position obtained as part of the GNSS position acquisition at action 415.

At action 420, the UE 115 transmits a capability indication to the non-terrestrial BS 105. The capability indication may indicate the UE 115 is capable of performing a global navigation satellite system (GNSS) acquisition during the connected mode connection 410. The capability indication transmitted by the UE 115 at action 420 may include an indication of a GNSS position acquisition time associated with the UE 115. The GNSS position acquisition time may indicate how long it will take the UE 115 to perform a GNSS position acquisition (e.g., 0.5 s, 0.75 s, 1.0 s, 1.5 s, 2.0 s, or otherwise). The capability indication may include other information about the capabilities of the UE 115 as it relates to GNSS position acquisition and/or other functionalities of the UE 115.

At action 425, the non-terrestrial BS 105 transmits to the UE 115 an indication of whether the non-terrestrial BS 105 will support the UE 115 performing the GNSS position acquisition during the connected mode connection 410. The indication may be communicated via a system information broadcast message (e.g., system information block (SIB) or other broadcast message), a radio resource control (RRC) message, and/or other suitable message or communication. In this regard, in some instances the UE 115 may receive the indication (e.g., via a system information broadcast message) prior to establishing the connected mode connection 410 with the non-terrestrial Bs 105 at action 405. In some instances, the UE may receive the indication (e.g., via an RRC message) after establishing the connected mode connection 410 with the non-terrestrial BS 105 (e.g., as shown by action 425).

The indication of whether the non-terrestrial BS 105 will support the UE 115 performing the GNSS position acquisition during the connected mode connection 410 may be an explicit indication and/or an implicit indication. For example, the indication may explicitly indicate (e.g., via a flag or a bit) whether the non-terrestrial BS 105 supports the UE performing GNSS position acquisition during connected mode (e.g., a 1 for supported or a 0 for not supported). As another example, the indication may implicitly indicate the non-terrestrial BS 105 supports GNSS position acquisition during connected mode by including one or more parameters associated with GNSS position acquisition during a connected mode connection 410, including without limitation one or more of an indication of a GNSS position recovery timer, an indication of a length of a GNSS position recovery timer, an indication of a GNSS position acquisition gap, an indication of reference time and/or allowable offset associated with a GNSS position acquisition gap, etc.

In some aspects, the non-terrestrial BS 105 may determine whether to support the UE 115 performing the GNSS position acquisition during the connected mode connection 410 based on information from the capability indication transmitted by the UE 115 at action 420. In some instances, the non-terrestrial BS 105 may determine that an amount of time the UE 115 will take to perform a GNSS position acquisition as indicated in the capability indication will or will not be supported by the non-terrestrial BS 105 for the connected mode connection 410 with the UE 115. For example, if a UE 115 takes too long to perform the GNSS position acquisition, then the non-terrestrial BS 105 may decide to not support the GNSS position acquisition for the UE 115 during the connected mode connection 410.

Accordingly, in some aspects, the indication received by the UE 115 at action 425 indicates that the non-terrestrial BS 105 will support the UE performing the GNSS position acquisition during the connected mode connection 410. Therefore, in some instances the UE 115 will perform a GNSS position acquisition at action 435. If the UE 115 successfully acquires a GNSS position at action 435, then the UE 115 may transmit an indication of the updated GNSS coordinates at action 440, as shown in FIG. 4. In some aspects, if the UE 115 fails to acquire a GNSS position at action 435, then the UE 115 may transition to an idle mode and/or declare a radio link failure.

On the other hand, in some aspects, the indication received by the UE 115 at action 425 indicates that the non-terrestrial BS 105 will not support the UE 115 performing the GNSS position acquisition during the connected mode connection 410. In some instances, if the indication indicates that the non-terrestrial BS 105 will not support the UE 115 performing the GNSS position acquisition during the connected mode connection 410, then upon expiration of an initial GNSS validity associated with the GNSS position acquisition at action 415, then the UE 115 may not perform the GNSS position acquisition at action 435 and, instead, transition to operating in an idle mode.

Figure 5:
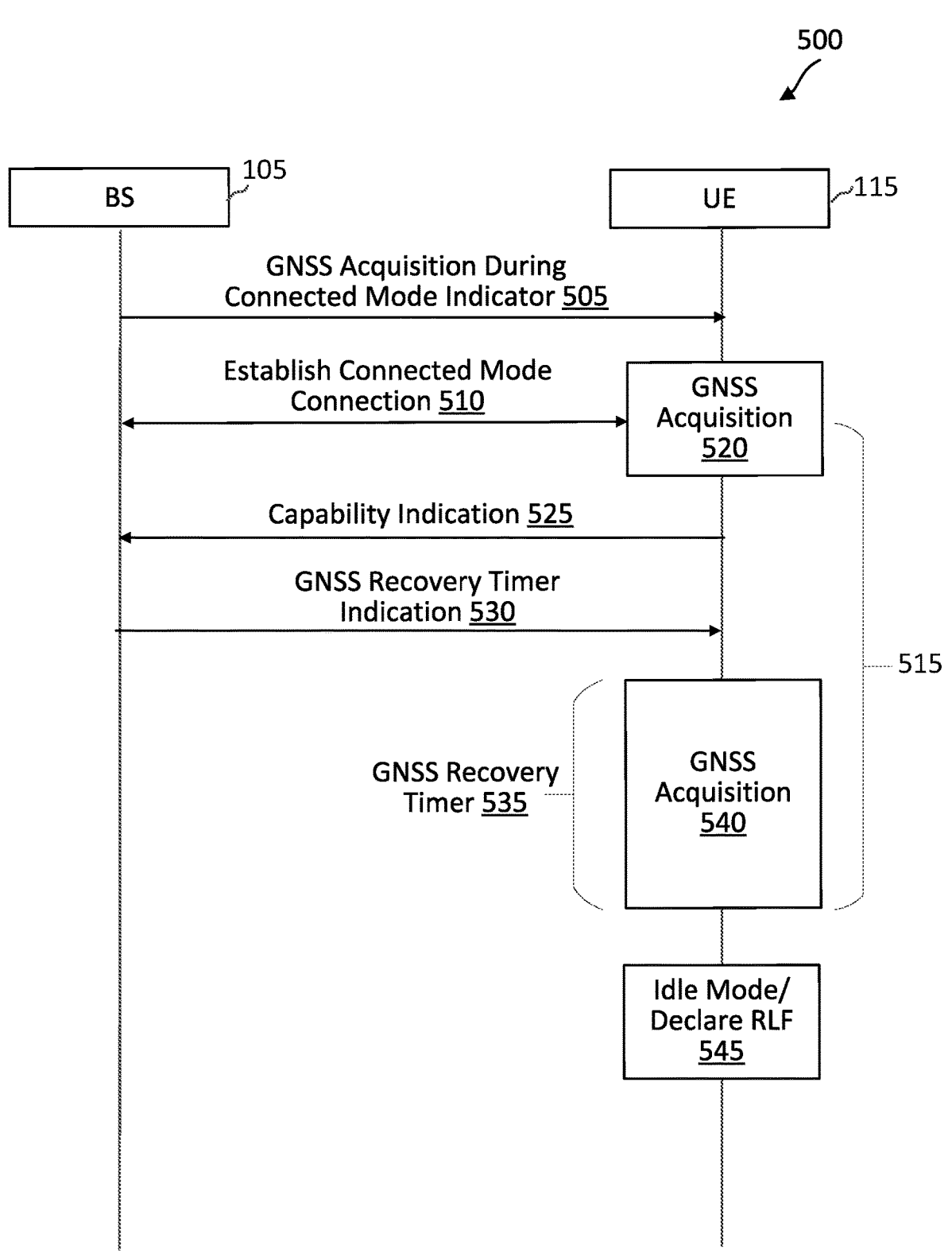
FIG. 5 illustrates a signaling diagram for a GNSS position acquisition during connected mode scheme according to one or more aspects of the present disclosure.

FIG. 5 illustrates a signaling diagram for a GNSS position acquisition during connected mode scheme 500 according to one or more aspects of the present disclosure. The GNSS position acquisition during connected mode scheme 500 illustrates aspects of performing a GNSS position acquisition during a connected mode connection in accordance with the present disclosure. In this regard, aspects of the GNSS position acquisition during connected mode scheme 500 may be utilized in the context of the wireless communication networks 100 and 300 as well as with other aspects of the present disclosure, including the GNSS position acquisition during connected mode schemes 400, 600, and 700.

As shown, at action 505, a non-terrestrial BS 105 transmits to a UE 115 an indication of whether the non-terrestrial BS 105 will support the UE 115 performing a GNSS position acquisition during a connected mode connection. The indication may be communicated via a system information broadcast message (e.g., system information block (SIB) or other broadcast message), a radio resource control (RRC) message, and/or other suitable message or communication. In this regard, in some instances the UE 115 may receive the indication (e.g., via a system information broadcast message) prior to establishing the connected mode connection with the non-terrestrial Bs 105 (e.g., as shown by action 505). In some instances, the UE may receive the indication (e.g., via an RRC message) after establishing a connected mode connection with the non-terrestrial BS 105.

The indication of whether the non-terrestrial BS 105 will support the UE 115 performing the GNSS position acquisition during the connected mode connection may be an explicit indication and/or an implicit indication. For example, the indication may explicitly indicate (e.g., via a flag or a bit) whether the non-terrestrial BS 105 supports the UE performing GNSS position acquisition during connected mode (e.g., a 1 for supported or a 0 for not supported). As another example, the indication may implicitly indicate the non-terrestrial BS 105 supports GNSS position acquisition during connected mode by including one or more parameters associated with GNSS position acquisition during a connected mode connection 515, including without limitation one or more of an indication of a GNSS position recovery timer, an indication of a length of a GNSS position recovery timer, an indication of a GNSS position acquisition gap, an indication of reference time and/or allowable offset associated with a GNSS position acquisition gap, etc.

Accordingly, in some aspects, the indication received by the UE 115 at action 505 indicates that the non-terrestrial BS 105 will support the UE 115 performing GNSS position acquisition during the connected mode connection. FIG. 5 illustrates an example where the BS 105 indicates at action 505 that it will support the UE 115 performing GNSS position acquisition during a connected mode connection.

On the other hand, in some aspects, the indication received by the UE 115 at action 505 indicates that the non-terrestrial BS 105 will not support the UE 115 performing the GNSS position acquisition during a connected mode connection. In some instances, if the indication indicates that the non-terrestrial BS 105 will not support the UE 115 performing the GNSS position acquisition during a connected mode connection, then upon expiration of an initial GNSS validity associated with the connected mode connection, then the UE 115 may not perform a GNSS position acquisition and, instead, will transition to operating in an idle mode. In this regard, the non-terrestrial BS 105 will not expect the UE 115 to perform a GNSS position acquisition during a connected mode connection.

At action 510, the non-terrestrial BS 105 and the UE 115 establish a connected mode connection 515. In some instances, at action 520, the UE 115 acquires an initial GNSS position as part of establishing the connected mode connection 515 with the non-terrestrial BS 105. In some instances, the UE 115 acquires an initial GNSS position separately from establishing the connected mode connection 515 with the non-terrestrial BS 105. The UE 115 may transmit an indication of the initial GNSS position and/or a validity time associated with the initial GNSS position to the non-terrestrial BS 105. In some aspects, in establishing the connected mode connection 515 with the non-terrestrial BS 105 at action 510, the UE 115 may transmit to the non-terrestrial BS 105 an indication of the initial GNSS position and/or an indication of the validity time associated with the initial GNSS position obtained as part of the GNSS position acquisition at action 520.

At action 525, the UE 115 transmits a capability indication to the non-terrestrial BS 105. The capability indication may indicate the UE 115 is capable of performing a global navigation satellite system (GNSS) acquisition during the connected mode connection 515. The capability indication transmitted by the UE 115 at action 525 may include an indication of a GNSS position acquisition time associated with the UE 115. The GNSS position acquisition time may indicate how long it will take the UE 115 to perform a GNSS position acquisition (e.g., 0.5 s, 0.75 s, 1.0 s, 1.5 s, 2.0 s, or otherwise). The capability indication may include other information about the capabilities of the UE 115 as it relates to GNSS position acquisition and/or other functionalities of the UE 115.

At action 530, the non-terrestrial BS 105 transmits to UE 115 an indication of a length of a GNSS recovery timer 535. The GNSS recovery timer 535 may be configured for use by the UE 115 in performing a GNSS position acquisition during the connected mode connection 515. In some aspects, the length of the GNSS recovery timer 535 may be based at least in part on the capability of the UE 115. For example, in some instances the non-terrestrial BS 105 may determine the length of the GNSS recovery timer 535 at least in part based on a GNSS position acquisition time of the UE 115.

At action 540, the UE 115 performs a GNSS position acquisition. In this regard, the UE 115 may start the GNSS recovery timer 535 as part of performing the GNSS position acquisition. If the UE 115 successfully acquires a GNSS position prior to the expiration of the GNSS recovery timer 535, then the UE 115 may transmit an indication of the updated GNSS coordinates to the non-terrestrial BS 105. If the UE 115 fails to acquire a GNSS position prior to the expiration of the GNSS recovery timer 535, then the UE 115 may transition to an idle mode and/or declare a radio link failure at action 545, as shown.

Figure 6:
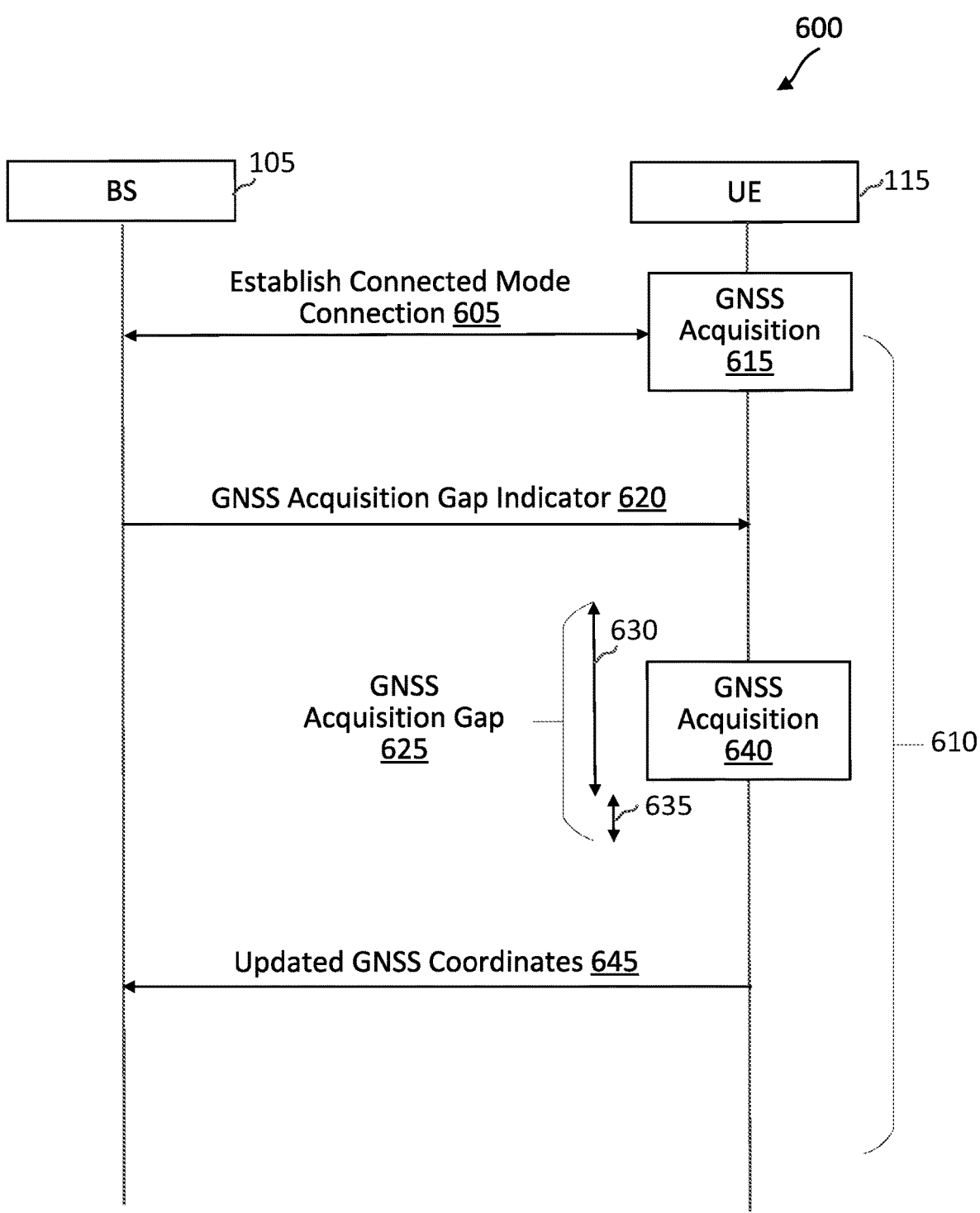
FIG. 6 illustrates a signaling diagram for a GNSS position acquisition during connected mode scheme according to one or more aspects of the present disclosure.

FIG. 6 illustrates a signaling diagram for a GNSS position acquisition during connected mode scheme 600 according to one or more aspects of the present disclosure. The GNSS position acquisition during connected mode scheme 600 illustrates aspects of performing a GNSS position acquisition during a connected mode connection in accordance with the present disclosure. In this regard, aspects of the GNSS position acquisition during connected mode scheme 600 may be utilized in the context of the wireless communication networks 100 and 300 as well as with other aspects of the present disclosure, including the GNSS position acquisition during connected mode schemes 400, 500, and 700.

As shown, at action 605, a non-terrestrial BS 105 and a UE 115 establish a connected mode connection 610. In some instances, at action 615, the UE 115 acquires an initial GNSS position as part of establishing the connected mode connection 610 with the non-terrestrial BS 105. In some instances, the UE 115 acquires an initial GNSS position separately from establishing the connected mode connection 610 with the non-terrestrial BS 105. The UE 115 may transmit an indication of the initial GNSS position and/or a validity time associated with the initial GNSS position to the non-terrestrial BS 105. In some aspects, in establishing the connected mode connection 610 with the non-terrestrial BS 105 at action 605, the UE 115 may transmit to the non-terrestrial BS 105 an indication of the initial GNSS position and/or an indication of the validity time associated with the initial GNSS position obtained as part of the GNSS position acquisition at action 615.

At action 620, the non-terrestrial BS 105 transmits to the UE 115 an indication of a GNSS position acquisition gap 625. The indication of the GNSS position acquisition gap 625 may be communicated via a radio resource control (RRC) message or other suitable message. The length of the GNSS position acquisition gap 625 may be based at least in part on a capability of the UE 115. For example, in some instances the UE may transmit a capability report to the non-terrestrial BS 105 (see, e.g., actions 420 and 525 of FIGS. 4 and 5, respectively). For example, in some instances the non-terrestrial BS 105 may determine the length of the GNSS position acquisition gap 625 at least in part based on a GNSS position acquisition time of the UE 115. In some instances, the indication of the GNSS position acquisition gap 625 includes an indication of a reference time 630 and/or an offset 635 relative to the reference time 630. In this regard, the GNSS position acquisition by the UE 115 may take a relatively long time (e.g., 0.5 s to 2.0 or more seconds) compared to other wireless communication actions (e.g., 1 ms to 100 ms). Accordingly, in some instances the GNSS position acquisition gap 625 may be less stringent than other timing indications. The GNSS position acquisition gap 625 may be indicated in terms of frame and/or subframe index and/or a common reference time (e.g., UTC).

The GNSS position acquisition gap 625 may be indicated based on a start time, an end time, and/or a length of time. In some instances, the GNSS position acquisition gap 625 may be indicated as a reference time 630 (e.g., a reference frame and/or subframe, a reference range of frame(s) and/or subframe(s), a reference time, and/or a reference time range). In some instances, the length of the GNSS position acquisition gap 625 may also include an associated offset 635. In this regard, the offset 635 may provide some flexibility to the timing of the GNSS position acquisition gap 625 relative to the reference time 630. For example, in some instances the UE 115 may utilize time beyond the reference time 630 of the GNSS position acquisition gap 625 so long as the UE 115 does not exceed the offset 635. The offset 635 may be indicated in a similar and/or a different manner as the reference time 630 (e.g., a number of frames and/or subframes, an offset frame and/or subframe, an offset range of frame(s) and/or subframe(s), an offset time, and/or an offset time range). The reference time 630 and/or the offset 635 may be indicated based on a start time, an end time, and/or a length of time.

At action 640, the UE 115 performs a GNSS position acquisition during the GNSS position acquisition gap 625 as indicated by the non-terrestrial BS 105. In this regard, the UE 115 may perform the GNSS position acquisition at action 640 based on a start time, an end time, and/or a length of the GNSS position acquisition gap 625, including a reference time/length and/or offset time/length, as indicated by the non-terrestrial BS 105 at action 620. If the UE 115 successfully acquires a GNSS position during the GNSS position acquisition gap 625, then the UE 115 may transmit an indication of the updated GNSS coordinates to the non-terrestrial BS 105 at action 645, as shown. If the UE 115 fails to acquire a GNSS position during the GNSS position acquisition gap 625, then the UE 115 may transition to an idle mode, declare a radio link failure, and/or initiate a GNSS position recovery procedure.

Figure 7:
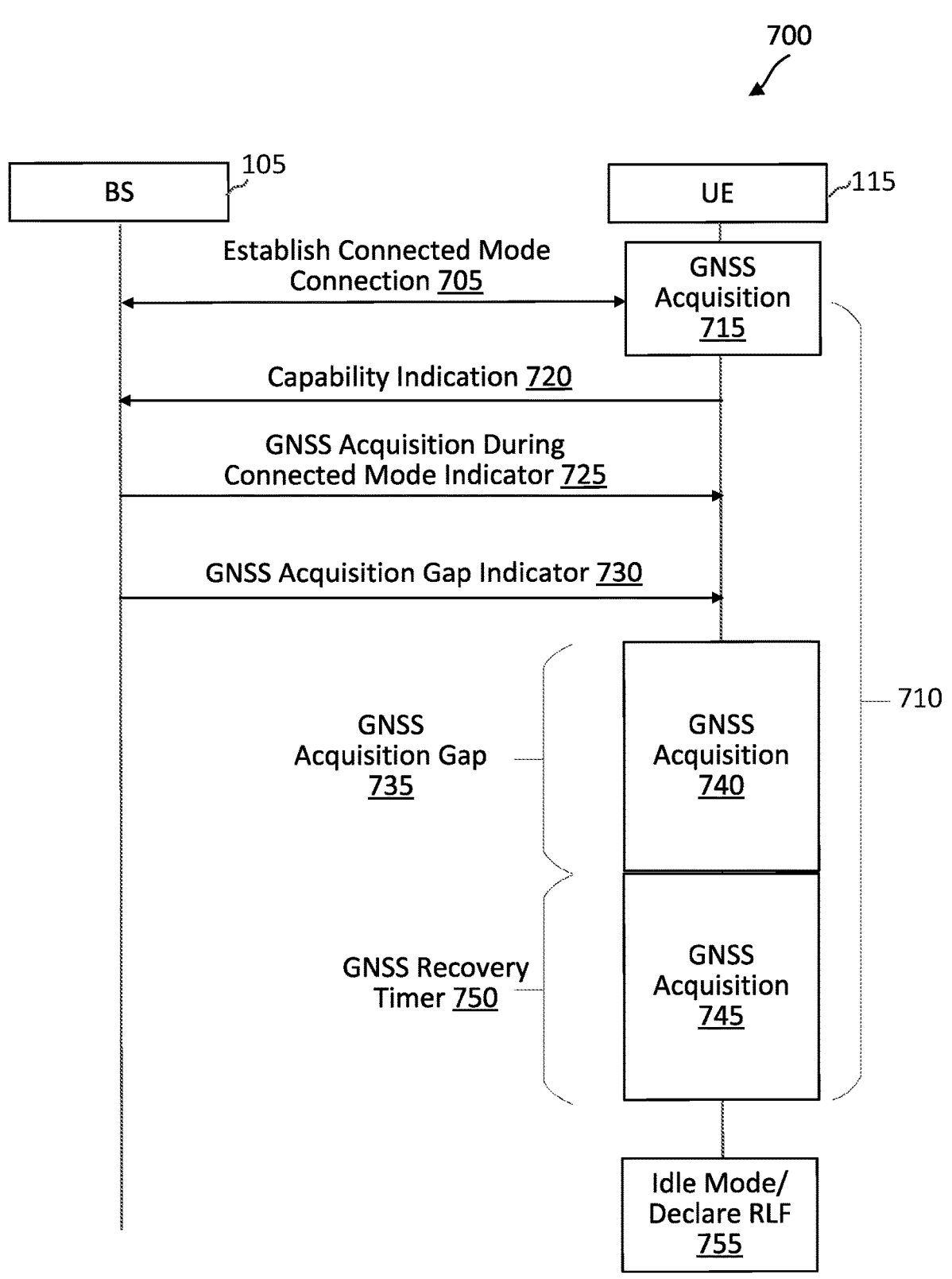
FIG. 7 illustrates a signaling diagram for a GNSS position acquisition during connected mode scheme according to one or more aspects of the present disclosure.

FIG. 7 illustrates a signaling diagram for a GNSS position acquisition during connected mode scheme 700 according to one or more aspects of the present disclosure. The GNSS position acquisition during connected mode scheme 700 illustrates aspects of performing a GNSS position acquisition during a connected mode connection in accordance with the present disclosure. In this regard, aspects of the GNSS position acquisition during connected mode scheme 700 may be utilized in the context of the wireless communication networks 100 and 300 as well as with other aspects of the present disclosure, including the GNSS position acquisition during connected mode schemes 400, 500, and 600. In some aspects, the GNSS position acquisition during connected mode scheme 700 includes similar actions to those discussed above with respect to the GNSS position acquisition during connected mode schemes 400, 500, and 600. Accordingly, some details will be omitted here for sake of brevity. Please refer to the descriptions above for the additional details as needed.

At action 705, a non-terrestrial BS 105 and a UE 115 establish a connected mode connection 710. In some instances, at action 715, the UE 115 acquires an initial GNSS position as part of establishing the connected mode connection 710 with the non-terrestrial BS 105.

At action 720, the UE 115 transmits a capability indication to the non-terrestrial BS 105. The capability indication may indicate the UE 115 is capable of performing a global navigation satellite system (GNSS) acquisition during the connected mode connection 710. The capability indication transmitted by the UE 115 at action 720 may include an indication of a GNSS position acquisition time associated with the UE 115.

At action 725, the non-terrestrial BS 105 transmits to the UE 115 an indication of whether the non-terrestrial BS 105 will support the UE 115 performing the GNSS position acquisition during the connected mode connection 710. In some instances, the indication may include an indication of a length of a GNSS position recovery timer 750.

At action 730, the non-terrestrial BS 105 transmits to the UE 115 an indication of a GNSS acquisition gap 735.

At action 740, the UE 115 performs a GNSS position acquisition during the GNSS acquisition gap 735 as indicated by the non-terrestrial BS 105. In this regard, the UE 115 may perform the GNSS position acquisition at action 740 based on a start time, an end time, and/or a length of the GNSS acquisition gap 735, including a reference time/length and/or offset time/length, as indicated by the non-terrestrial BS 105 at action 730. If the UE 115 successfully acquires a GNSS position during the GNSS acquisition gap 735, then the UE 115 may transmit an indication of the updated GNSS coordinates to the non-terrestrial BS 105. If the UE 115 fails to acquire a GNSS position during the GNSS acquisition gap 735, then the UE 115 may initiate a GNSS position recovery procedure at action 745. In some instances, the UE performs the GNSS position recovery procedure based on the GNSS position recovery timer 750. In this regard, the UE 115 may start the GNSS position recovery timer 750 as part of performing the GNSS position recover procedure. If the UE 115 successfully acquires a GNSS position prior to the expiration of the GNSS position recovery timer 750, then the UE 115 may transmit an indication of the updated GNSS coordinates to the non-terrestrial BS 105. If the UE 115 fails to acquire a GNSS position prior to the expiration of the GNSS position recovery timer 750, then the UE 115 may transition to an idle mode and/or declare a radio link failure at action 755, as shown.

Figure 8:
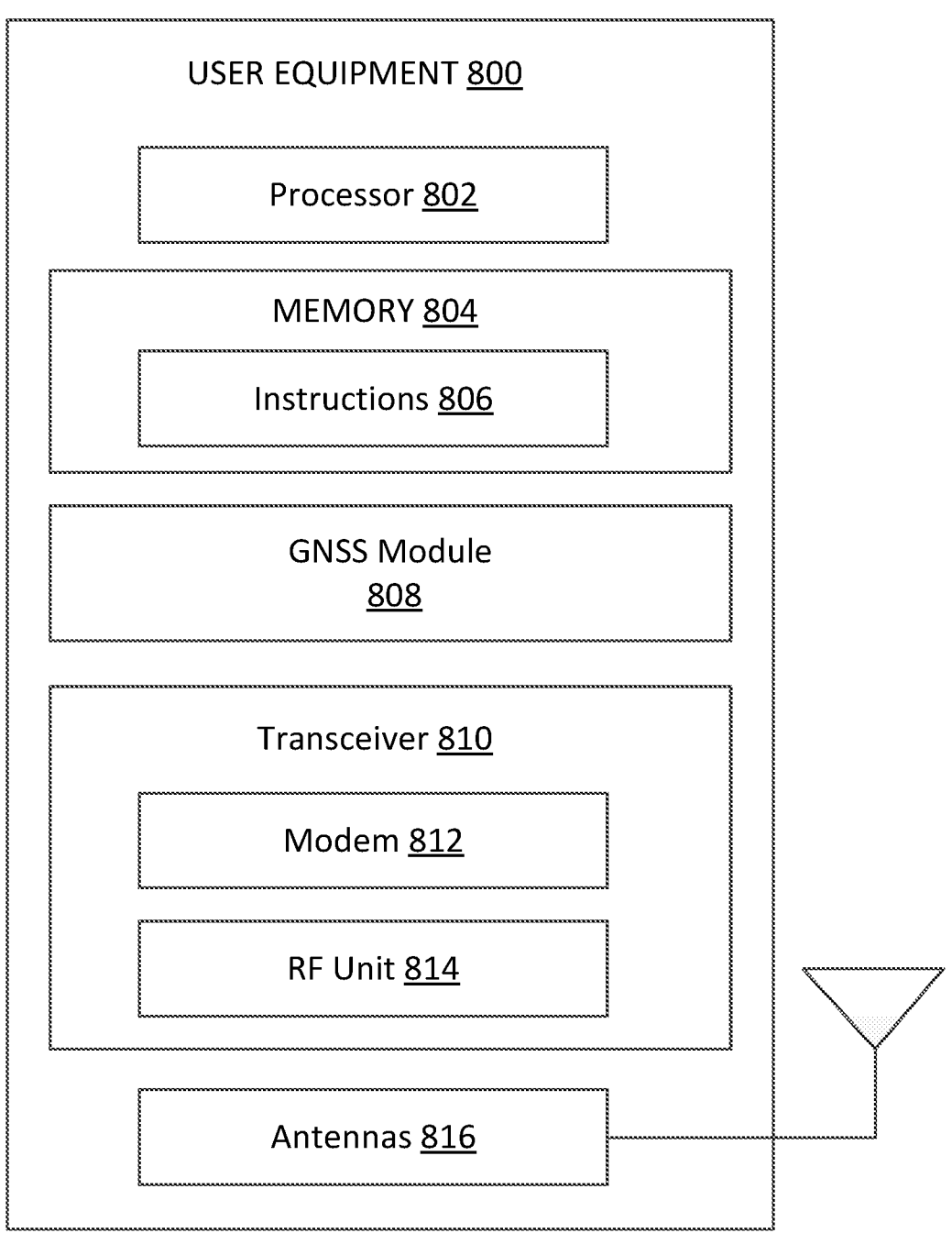
FIG. 8 illustrates a block diagram of a user equipment (UE) according to one or more aspects of the present disclosure.

FIG. 8 is a block diagram of a UE 800 according to one or more aspects of the present disclosure. The UE 800 may be, for instance, a UE 115 as discussed in FIGS. 1-7. As shown, the UE 800 may include a processor 802, a memory 804, a GNSS module 808, a transceiver 810 including a modem subsystem 812 and an RF unit 814, and one or more antennas 816. These elements may be coupled with one another. The term "coupled" may refer to directly or indirectly coupled or connected to one or more intervening elements. For instance, these elements may be in direct or indirect communication with each other, for instance via one or more buses.

The processor 802 may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to a UE 115 in connection with aspects of the present disclosure, for instance, aspects of FIGS. 3-7, 10, and 12. Instructions 806 may also be referred to as program code. The program code may be for causing a wireless communication device to perform these operations, for instance by causing one or more processors (such as processor 802) to control or command the UE 800 to do so. The terms "instructions" and "code" should be interpreted broadly to include any type of computer-readable statement(s). For instance, the terms "instructions" and "code" may refer to one or more programs, routines, sub-routines, functions, procedures, etc. "Instructions" and "code" may include a single computer-readable statement or many computer-readable statements.

The GNSS module 808 may be implemented via hardware, software, or combinations thereof. For instance, the GNSS module 808 may be implemented as a processor, circuit, and/or instructions 806 stored in the memory 804 and executed by the processor 802. In some aspects, the GNSS module 808 can be integrated within the modem subsystem 812. For instance, the GNSS module 808 can be implemented by a combination of software components (e.g., executed by a DSP or a general processor) and hardware components (e.g., logic gates and circuitry) within the modem subsystem 812. The GNSS module 808 may communicate with one or more components of the UE 800 to implement various aspects of the present disclosure, for instance, aspects of FIGS. 3-7, 10, and 12.

In some aspects, the GNSS module 808 may be configured, along with other components of the UE 800, to transmit a capability indication, the capability indication indicating the UE is capable of performing a global navigation satellite system (GNSS) acquisition during a connected mode connection. In some aspects, the GNSS module 808 may be configured, along with other components of the UE 800, to receive an indication of whether the non-terrestrial network unit will support the UE performing the GNSS acquisition during the connected mode connection. In some aspects, the GNSS module 808 may be configured, along with other components of the UE 800, to perform a GNSS acquisition during the connected mode connection with the non-terrestrial network unit. In some aspects, the GNSS module 808 may be configured, along with other components of the UE 800, to receive an indication of a global navigation satellite system (GNSS) acquisition gap during a connected mode connection and perform a GNSS position acquisition procedure during the GNSS acquisition gap. In some aspects, the GNSS module 808 may be configured, along with other components of the UE 800, to establish a connected mode connection with a non-terrestrial network unit.

As shown, the transceiver 810 may include the modem subsystem 812 and the RF unit 814. The transceiver 810 can be configured to communicate bi-directionally with other devices, such as the BSs 105 and/or network units. The modem subsystem 812 may be configured to modulate and/or encode the data from the memory 804 and/or the GNSS module 808 according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., communication signals, data signals, control signals, capability reports, GNSS position acquisition timing, GNSS position information, etc.) from the modem subsystem 812 (on outbound transmissions). The RF unit 814 may be further configured to perform analog beamforming in conjunction with the digital beamforming. Although shown as integrated together in transceiver 810, the modem subsystem 812 and the RF unit 814 may be separate devices that are coupled together at the UE 800 to enable the UE 800 to communicate with other devices.

The RF unit 814 may provide the modulated and/or processed data, e.g., data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., communication signals, data signals, control signals, GNSS position acquisition during connected mode indications, GNSS position acquisition gap indications, GNSS recovery timer indications, etc.) to the GNSS module 808 for processing. The antennas 816 may include multiple antennas of similar or different designs in order to sustain multiple transmission links.

Figure 9:
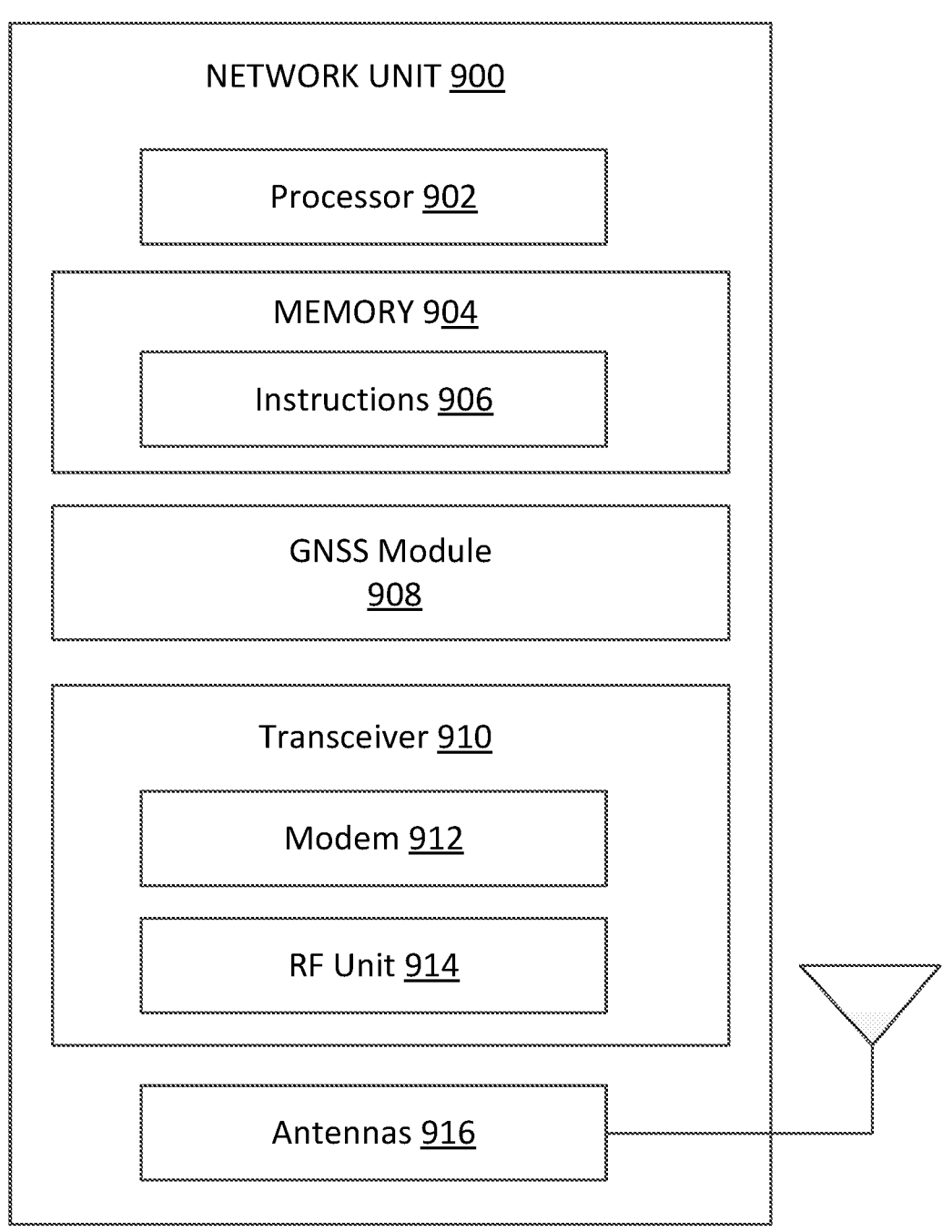
FIG. 9 illustrates a block diagram of a network unit according to one or more aspects of the present disclosure.

FIG. 9 is a block diagram of a network unit 900 according to one or more aspects of the present disclosure. The network unit 900 may be a BS 105, CU 210, DU 230, and/or RU 240 as discussed in FIGS. 1-7. Accordingly, the network unit 900 may include a BS. The network unit 900 may be a non-terrestrial network unit. The BS may be an aggregated BS or a disaggregated BS, as described above. As shown, the network unit 900 may include a processor 902, a memory 904, a GNSS module 908, a transceiver 910 including a modem subsystem 912 and a radio frequency (RF) unit 914, and one or more antennas 916. These elements may be coupled with one another. The term "coupled" may refer to directly or indirectly coupled or connected to one or more intervening elements. For instance, these elements may be in direct or indirect communication with each other, for instance via one or more buses.

The processor 902 may have various features as a specific-type processor. For instance, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the network unit 900 to perform operations described herein, for instance, aspects of FIGS. 3-7, 11, and 13. Instructions 906 may also be referred to as program code. The program code may be for causing a wireless communication device to perform these operations, for instance by causing one or more processors (such as processor 902) to control or command the network unit 900 to do so. The terms "instructions" and "code" should be interpreted broadly to include any type of computer-readable statement(s). For instance, the terms "instructions" and "code" may refer to one or more programs, routines, sub-routines, functions, procedures, etc. "Instructions" and "code" may include a single computer-readable statement or many computer-readable statements.

The GNSS module 908 may be implemented via hardware, software, or combinations thereof. For instance, the GNSS module 908 may be implemented as a processor, circuit, and/or instructions 906 stored in the memory 904 and executed by the processor 902. In some instances, the GNSS module 908 can be integrated within the modem subsystem 912. For instance, the GNSS module 908 can be implemented by a combination of software components (e.g., executed by a DSP or a general processor) and hardware components (e.g., logic gates and circuitry) within the modem subsystem 912. The GNSS module 908 may communicate with one or more components of the network unit 900 to implement various aspects of the present disclosure, for instance, aspects of FIGS. 3-7, 11, and 13.

In some aspects, the GNSS module 908 may be configured, along with other components of the network unit 900, to receive, from a user equipment (UE), a capability indication, the capability indication indicating the UE is capable of performing a global navigation satellite system (GNSS) acquisition during a connected mode connection. In some aspects, the GNSS module 908 may be configured, along with other components of the network unit 900, to transmit an indication of whether the non-terrestrial network unit will support the UE performing the GNSS acquisition during the connected mode connection. In some aspects, the GNSS module 908 may be configured, along with other components of the network unit 900, to transmit an indication of a length of a GNSS position recovery timer. In some aspects, the GNSS module 908 may be configured, along with other components of the network unit 900, to transmit an indication of a GNSS acquisition gap. In some aspects, the GNSS module 908 may be configured, along with other components of the network unit 900, to establish a connected mode connection with a user equipment (UE).

As shown, the transceiver 910 may include the modem subsystem 912 and the RF unit 914. The transceiver 910 can be configured to communicate bi-directionally with other devices, such as the UE 115, UE 800, and/or another network unit. The modem subsystem 912 may be configured to modulate and/or encode data according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., communication signals, data signals, control signals, GNSS position acquisition during connected mode indications, GNSS position acquisition gap indications, GNSS recovery timer indications, etc.) from the modem subsystem 912 (on outbound transmissions). The RF unit 914 may be further configured to perform analog beamforming in conjunction with the digital beamforming. Although shown as integrated together in transceiver 910, the modem subsystem 912, and/or the RF unit 914 may be separate devices that are coupled together at the network unit 900 to enable the network unit 900 to communicate with other devices.

The RF unit 914 may provide the modulated and/or processed data, e.g., data packets (or, more generally, data messages that may contain one or more data packets and other information), to the antennas 916 for transmission to one or more other devices. The antennas 916 may further receive data messages transmitted from other devices and provide the received data messages for processing and/or demodulation at the transceiver 910. The transceiver 910 may provide the demodulated and decoded data (e.g., communication signals, data signals, control signals, capability reports, GNSS position acquisition timing, GNSS position information, etc.) to the GNSS module 908 for processing. The antennas 916 may include multiple antennas of similar or different designs in order to sustain multiple transmission links.

FIG. 10 is a flow diagram illustrating a wireless communication method 1000 according to one or more aspects of the present disclosure. Aspects of the method 1000 can be executed by a computing device (e.g., a processor, processing circuit, and/or other suitable component) of a wireless communication device or other suitable means for performing the blocks. For instance, the wireless communication device may be a UE (e.g., UE 115 or UE 800). The UE may utilize one or more components, such as the processor 802, the memory 804, the GNSS module 808, the transceiver 810, the modem subsystem 812, the RF unit 814, and/or the one or more antennas 816, to execute the blocks of method 1000. The method 1000 may employ similar mechanisms as described in FIGS. 3-7. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1010, the UE (e.g., UE 115 and/or UE 800) transmits a capability indication to a non-terrestrial network unit. The capability indication may indicate the UE is capable of performing a global navigation satellite system (GNSS) acquisition during a connected mode connection. The capability indication transmitted by the UE may include an indication of a GNSS position acquisition time associated with the UE. The GNSS position acquisition time may indicate how long it will take the UE to perform a GNSS position acquisition (e.g., 0.5 s, 0.75 s, 1.0 s, 1.5 s, 2.0 s, or otherwise). The capability indication may include other information about the capabilities of the UE as it relates to GNSS position acquisition and/or other functionalities of the UE.

At block 1020, the UE receives, from the non-terrestrial network unit, an indication of whether the non-terrestrial network unit will support the UE performing the GNSS position acquisition during the connected mode connection. The UE may receive the indication via a system information broadcast message (e.g., system information block (SIB) or other broadcast message), a radio resource control (RRC) message, and/or other suitable message or communication. In this regard, in some instances the UE receives the indication (e.g., via the system information broadcast message) prior to establishing the connected mode connection with the non-terrestrial network unit. Further, in some instances the UE receives the indication (e.g., via an RRC message) after establishing the connected mode connection with the non-terrestrial network unit.

The indication of whether the non-terrestrial network unit will support the UE performing the GNSS position acquisition during the connected mode connection may be an explicit indication and/or an implicit indication. For example, the SIB, RRC message, and/or other communication from the non-terrestrial network unit carrying the indication may explicitly indicate (e.g., via a flag or a bit) whether the non-terrestrial network unit supports GNSS position acquisition during connected mode (e.g., a 1 for supported or a 0 for not supported). As another example, the SIB, RRC message, and/or other communication from the non-terrestrial network unit carrying the indication may implicitly indicate the non-terrestrial network unit supports GNSS position acquisition during connected mode by including one or more parameters associated with GNSS position acquisition during a connected mode connection, including without limitation one or more of an indication of a GNSS position recovery timer, an indication of a length of a GNSS position recovery timer, an indication of a GNSS position acquisition gap, an indication of reference time and/or allowable offset associated with a GNSS position acquisition gap, etc. In some aspects, the UE receives the indication indicating support of a time period associated with GNSS position recovery during a connected mode connection with the non-terrestrial network unit.

In some aspects, the non-terrestrial network unit may determine whether to support the UE performing the GNSS position acquisition during the connected mode connection based on information from the capability indication transmitted by the UE at block 1010. In some instances, the non-terrestrial network unit may determine that an amount of time the UE will take to perform a GNSS position acquisition as indicated in the capability indication will or will not be supported by the non-terrestrial network unit for the connected mode connection with the UE. For example, if a UE takes too long to perform the GNSS position acquisition, then the non-terrestrial network unit may decide to not support the GNSS position acquisition during the connected mode connection for that UE. The capability indication transmitted by the UE at block 1010 may include an indication of a GNSS position acquisition time associated with the UE to allow the non-terrestrial network unit to make a determination as to whether the UE will be allowed to perform GNSS position acquisition during the connected mode connection.

Accordingly, in some aspects, the indication received by the UE indicates that the non-terrestrial network unit will support the UE performing the GNSS position acquisition during the connected mode connection. The determination to support the UE performing the GNSS position acquisition may be based at least in part on the GNSS position acquisition time of the UE. On the other hand, in some aspects, the indication received by the UE indicates that the non-terrestrial network unit will not support the UE performing the GNSS position acquisition during the connected mode connection. Again, the determination to not support the UE performing the GNSS position acquisition may be based at least in part on the GNSS position acquisition time of the UE. In some instances, if the indication received by the UE indicates that the non-terrestrial network unit will not support the UE performing the GNSS position acquisition during the connected mode connection, then upon expiration of an initial GNSS validity associated with the connected mode connection the UE may transition to an idle mode.

At block 1030, the UE performs, based at least in part on the receiving the indication, the GNSS position acquisition during the connected mode connection with the non-terrestrial network unit. In this regard, the UE may perform the GNSS position acquisition in response to the indication received by the UE at block 1020 indicating that the non-terrestrial network unit will support the UE performing the GNSS position acquisition during the connected mode connection. The UE may perform the GNSS position acquisition to acquire an updated GNSS position. The UE may report the updated GNSS position to the non-terrestrial network unit. The non-terrestrial network unit may then use the updated position to configure the resources utilized to communicate with the UE to improve and/or optimize the communications.

In some instances, the UE initiates the GNSS position acquisition based on an expiration of an initial GNSS validity associated with the connected mode connection. In this regard, the UE may obtain an initial GNSS position when establishing the connected mode connection with the non-terrestrial unit. The initial GNSS position may be valid for a period of time (e.g., based on UE mobility, network conditions, and/or other factors). Accordingly, in some instances the UE initiates the GNSS position acquisition based on the expiration of the initial GNSS validity (e.g., upon the expiration, before the expiration (e.g., based on a predetermined time, which may be based on the GNSS position acquisition time of the UE), and/or after the expiration).

In some aspects, the UE performs the GNSS acquisition based on a GNSS position recovery timer (see, e.g., FIGS. 5 and 7). The UE may receive an indication of a length of a GNSS position recovery timer from the non-terrestrial network unit. The length of the GNSS position recovery timer may be based at least in part on the capability indication transmitted by the UE at block 1010. For example, in some instances the non-terrestrial network unit may determine the length of the GNSS position recovery timer at least in part based on the GNSS position acquisition time of the UE indicated in the capability indication. The UE may implement the GNSS position recovery timer in performing the GNSS position acquisition. For example, the UE may start the GNSS position recovery timer upon starting the GNSS position acquisition. If the UE fails to successfully acquire GNSS positioning before expiration of the GNSS position recovery timer, then the UE may transition to an idle mode and/or declare a radio link failure. If the UE successfully acquires GNSS positioning before expiration of the GNSS position recovery timer, then the UE may report the updated GNSS position to the non-terrestrial network unit.

In some aspects, the UE performs the GNSS acquisition based on a GNSS position acquisition gap (see, e.g., FIGS. 6 and 7). The UE may receive an indication of the GNSS position acquisition gap from the non-terrestrial network unit. The UE may receive the indication of the GNSS position acquisition gap via a radio resource control (RRC) message or other suitable message. The length of the GNSS position acquisition gap may be based at least in part on the capability indication transmitted by the UE at block 1010. For example, in some instances the non-terrestrial network unit may determine the length of the GNSS position acquisition gap at least in part based on the GNSS position acquisition time of the UE indicated in the capability indication. In some instances, the indication of the GNSS position acquisition gap includes an indication of a reference time duration (e.g., reference time 630) and an allowable offset (e.g., offset 635) relative to the reference time duration. In this regard, the GNSS position acquisition by a UE may take a relatively long time (e.g., 0.5 s to 2.0 or more seconds) compared to other wireless communication actions (e.g., 1 ms to 100 ms). Accordingly, in some instances the GNSS position acquisition gap may be less stringent than other timing indications. The GNSS position acquisition gap may be indicated in terms of frame and/or subframe index and/or a common reference time (e.g., UTC). The GNSS position acquisition gap may be indicated based on a start time, an end time, and/or a length of time. In some instances, the GNSS position acquisition gap may be indicated as a reference length (e.g., a reference frame and/or subframe, a reference range of frame(s) and/or subframe(s), a reference time, and/or a reference time range). In some instances, the length of the GNSS position acquisition gap may also include an associated offset. In this regard, the offset may provide some flexibility to the timing of the GNSS position acquisition gap relative to the reference length. For example, in some instances the UE may utilize time beyond the reference length of the GNSS position acquisition gap so long as the UE does not exceed the offset. The offset may be indicated in a similar and/or a different manner as the reference length (e.g., a number of frames and/or subframes, an offset frame and/or subframe, an offset range of frame(s) and/or subframe(s), an offset time, and/or an offset time range). In some instances, the reference length and/or the offset may be indicated based on a start time, an end time, and/or a length of time.

In some instances, the UE performs a GNSS acquisition during the GNSS position acquisition gap. If the UE fails to successfully acquire GNSS positioning during the GNSS position acquisition gap, then the UE may initiate a further GNSS position acquisition, which may be based on the GNSS position recovery timer as discussed above. For example, the UE may initially attempt to perform GNSS position acquisition in a gap indicated by the non-terrestrial network unit and, if that fails, initiate a GNSS position recovery procedure based on a GNSS position recovery timer (see, e.g., FIG. 7).

FIG. 11 is a flow diagram illustrating a wireless communication method 1100 according to one or more aspects of the present disclosure. Aspects of the method 1100 can be executed by a computing device (e.g., a processor, processing circuit, and/or other suitable component) of a wireless communication device or other suitable means for performing the blocks. For instance, the wireless communication device may include a network unit (e.g., network unit 900, BS 105, CU 210, DU 230, and/or RU 240). The non-terrestrial network unit 900 may utilize one or more components, such as the processor 902, the memory 904, the GNSS module 908, the transceiver 910, the modem subsystem 912, the RF unit 914, and/or the one or more antennas 916, to execute the blocks of method 1100. The method 1100 may employ similar mechanisms as described in FIGS. 3-7. As illustrated, the method 1100 includes a number of enumerated blocks, but aspects of the method 1100 may include additional blocks before, after, and in between the enumerated blocks. In some aspects, one or more of the enumerated blocks may be omitted or performed in a different order.

At block 1110, the non-terrestrial network unit (network unit 900, BS 105, CU 210, DU 230, and/or RU 240) receives a capability indication from a user equipment (UE). The capability indication may indicate the UE is capable of performing a global navigation satellite system (GNSS) acquisition during a connected mode connection. The capability indication received from the UE may include an indication of a GNSS position acquisition time associated with the UE. The GNSS position acquisition time may indicate how long it will take the UE to perform a GNSS position acquisition (e.g., 0.5 s, 0.75 s, 1.0 s, 1.5 s, 2.0 s, or otherwise). The capability indication may include other information about the capabilities of the UE as it relates to GNSS position acquisition and/or other functionalities of the UE.

At block 1120, the non-terrestrial network unit transmits, to the UE, an indication of whether the non-terrestrial network unit will support the UE performing the GNSS position acquisition during the connected mode connection. The non-terrestrial network unit may transmit the indication via a system information broadcast message (e.g., system information block (SIB) or other broadcast message), a radio resource control (RRC) message, and/or other suitable message or communication. In this regard, in some instances the non-terrestrial network unit transmits the indication (e.g., via the system information broadcast message) prior to establishing the connected mode connection with the UE. Further, in some instances the non-terrestrial network unit transmits the indication (e.g., via an RRC message) after establishing the connected mode connection with the non-terrestrial network unit.

The indication of whether the non-terrestrial network unit will support the UE performing the GNSS position acquisition during the connected mode connection may be an explicit indication and/or an implicit indication. For example, the SIB, RRC message, and/or other communication transmitted by the non-terrestrial network unit carrying the indication may explicitly indicate (e.g., via a flag or a bit) whether the non-terrestrial network unit supports GNSS position acquisition during connected mode (e.g., a 1 for supported or a 0 for not supported). As another example, the SIB, RRC message, and/or other communication from the non-terrestrial network unit carrying the indication may implicitly indicate the non-terrestrial network unit supports GNSS position acquisition during connected mode by including one or more parameters associated with GNSS position acquisition during a connected mode connection, including without limitation one or more of an indication of a GNSS position recovery timer, an indication of a length of a GNSS position recovery timer, an indication of a GNSS position acquisition gap, an indication of reference time and/or allowable offset associated with a GNSS position acquisition gap, etc. In some aspects, the network unit transmits the indication indicating support of a time period associated with GNSS position recovery during a connected mode connection with the UE.

In some aspects, the non-terrestrial network unit may determine whether to support the UE performing the GNSS position acquisition during the connected mode connection based on information from the capability indication received from the UE at block 1110. In some instances, the non-terrestrial network unit may determine that an amount of time the UE will take to perform a GNSS position acquisition as indicated in the capability indication will or will not be supported by the non-terrestrial network unit for the connected mode connection with the UE. For example, if a UE takes too long to perform the GNSS position acquisition, then the non-terrestrial network unit may decide to not support the GNSS position acquisition during the connected mode connection for that UE. The capability indication received from the UE at block 1110 may include an indication of a GNSS position acquisition time associated with the UE to allow the non-terrestrial network unit to make a determination as to whether the UE will be allowed to perform GNSS position acquisition during the connected mode connection.

Accordingly, in some aspects, the indication transmitted by the non-terrestrial network unit indicates that the non-terrestrial network unit will support the UE performing the GNSS position acquisition during the connected mode connection. The determination to support the UE performing the GNSS position acquisition may be based at least in part on the GNSS position acquisition time of the UE. On the other hand, in some aspects, the indication transmitted by the non-terrestrial network unit indicates that the non-terrestrial network unit will not support the UE performing the GNSS position acquisition during the connected mode connection. Again, the determination to not support the UE performing the GNSS position acquisition may be based at least in part on the GNSS position acquisition time of the UE. In some instances, if the indication transmitted by the non-terrestrial network unit indicates that the non-terrestrial network unit will not support the UE performing the GNSS position acquisition during the connected mode connection, then upon expiration of an initial GNSS validity associated with the connected mode connection the non-terrestrial network unit expects that the UE will transition to an idle mode.

In some aspects, the indication transmitted by the non-terrestrial network unit indicates the use of a GNSS position recovery timer. In some instances, the non-terrestrial network unit transmits an indication of a length of a GNSS position recovery timer from the non-terrestrial network unit. The indication of the length of the GNSS position recovery timer may be transmitted with and/or separately from the indication of the use of the GNSS position recovery timer. The length of the GNSS position recovery timer may be based at least in part on the capability indication received from the UE at block 1110. For example, in some instances the non-terrestrial network unit may determine the length of the GNSS position recovery timer at least in part based on the GNSS position acquisition time of the UE indicated in the capability indication. The GNSS position recovery timer may be utilized by the UE in performing the GNSS position acquisition during the connected mode connection.

In some aspects, the non-terrestrial network unit transmits an indication of a GNSS position acquisition gap to the UE. The non-terrestrial network unit may transmit the indication of the GNSS position acquisition gap via a radio resource control (RRC) message or other suitable message. The length of the GNSS position acquisition gap may be based at least in part on the capability indication received from the UE at block 1110. For example, in some instances the non-terrestrial network unit may determine the length of the GNSS position acquisition gap at least in part based on the GNSS position acquisition time of the UE indicated in the capability indication. In some instances, the indication of the GNSS position acquisition gap includes an indication of a reference time duration (e.g., reference time 630) and an allowable offset (e.g., offset 635) relative to the reference time duration. In this regard, GNSS position acquisition by a UE may take a relatively long time (e.g., 0.5 s to 2.0 or more seconds) compared to other wireless communication actions (e.g., 1 ms to 100 ms). Accordingly, in some instances the GNSS position acquisition gap may be less stringent than other timing indications. The GNSS position acquisition gap may be indicated in terms of frame and/or subframe index and/or a common reference time (e.g., UTC). The GNSS position acquisition gap may be indicated based on a start time, an end time, and/or a length of time. In some instances, the GNSS position acquisition gap may be indicated as a reference length (e.g., a reference frame and/or subframe, a reference range of frame(s) and/or subframe(s), a reference time, and/or a reference time range). In some instances, the length of the GNSS position acquisition gap may also include an associated offset. In this regard, the offset may provide some flexibility to the timing of the GNSS position acquisition gap relative to the reference length. The offset may be indicated in a similar and/or a different manner as the reference length (e.g., a number of frames and/or subframes, an offset frame and/or subframe, an offset range of frame(s) and/or subframe(s), an offset time, and/or an offset time range). In some instances, the reference length and/or the offset may be indicated based on a start time, an end time, and/or a length of time.

Figure 12:
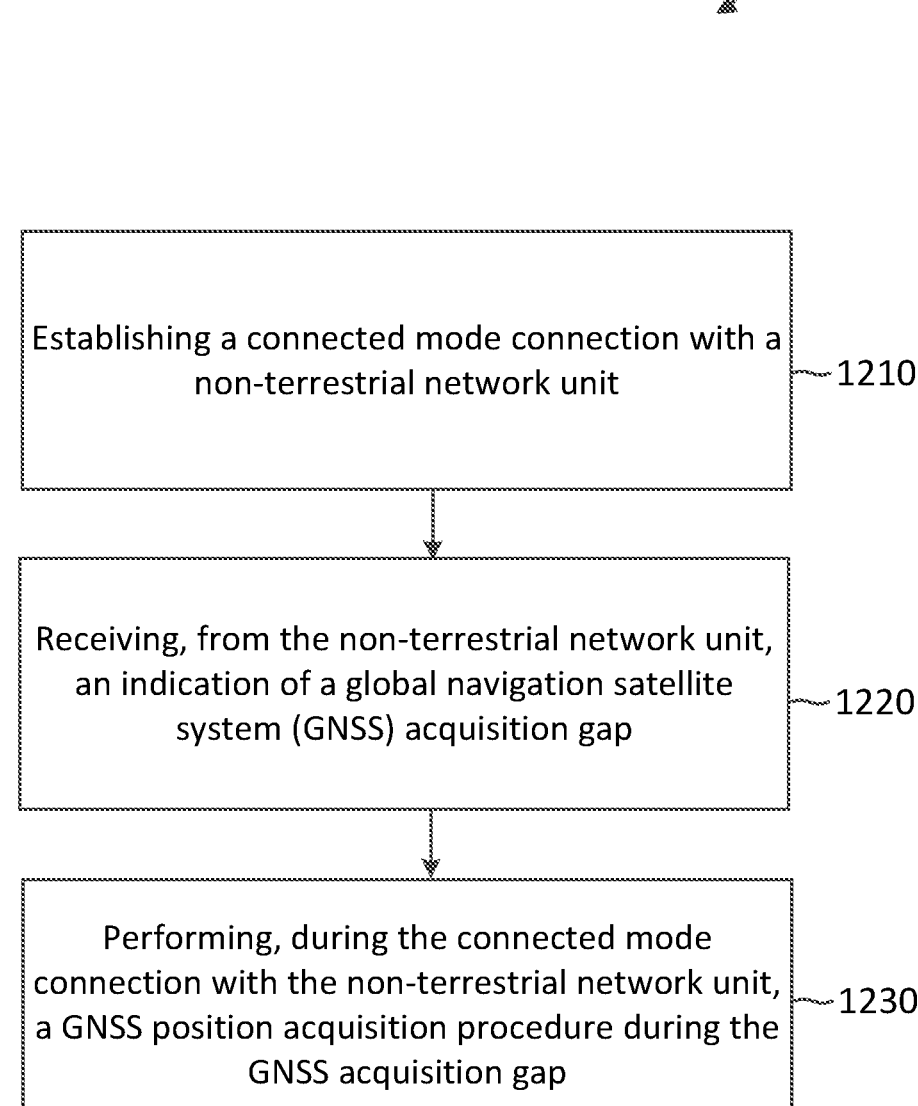
FIG. 12 illustrates a flow diagram of a wireless communication method according to some aspects of the present disclosure.

FIG. 12 is a flow diagram illustrating a wireless communication method 1200 according to one or more aspects of the present disclosure. Aspects of the method 1200 can be executed by a computing device (e.g., a processor, processing circuit, and/or other suitable component) of a wireless communication device or other suitable means for performing the blocks. For instance, the wireless communication device may be a UE (e.g., UE 115 or UE 800). The UE may utilize one or more components, such as the processor 802, the memory 804, the GNSS module 808, the transceiver 810, the modem subsystem 812, the RF unit 814, and/or the one or more antennas 816, to execute the blocks of method 1200. The method 1200 may employ similar mechanisms as described in FIGS. 3-7. As illustrated, the method 1200 includes a number of enumerated blocks, but aspects of the method 1200 may include additional blocks before, after, and in between the enumerated blocks. In some aspects, one or more of the enumerated blocks may be omitted or performed in a different order.

At block 1210, the UE (e.g., UE 115 and/or UE 800) establishes a connected mode connection with a non-terrestrial network unit. In some instances, the UE acquires an initial GNSS position as part of establishing the connected mode connection with the non-terrestrial network unit. In some instances, the UE acquires an initial GNSS position separately from establishing the connected mode connection with the non-terrestrial network unit. Regardless of whether the UE acquires the initial GNSS position as part of establishing the connected mode connection or separately, the UE may transmit an indication of the initial GNSS position and/or a validity time associated with the initial GNSS position to the network unit. In some aspects, the UE transmits the indication of the initial GNSS position and/or the indication of the validity time associated with the initial GNSS position to the network unit as part of establishing the connected mode connection with the non-terrestrial network unit.

At block 1220, the UE receives, from the non-terrestrial network unit, an indication of a GNSS acquisition gap. The UE may receive the indication of the GNSS position acquisition gap via a radio resource control (RRC) message or other suitable message. The length of the GNSS position acquisition gap may be based at least in part on the capability of the UE. For example, in some instances the non-terrestrial network unit may determine the length of the GNSS position acquisition gap at least in part based on a GNSS position acquisition time of the UE. In some instances, the indication of the GNSS position acquisition gap includes an indication of a reference time duration (e.g., reference time 630) and an allowable offset (e.g., offset 635) relative to the reference time duration. In this regard, the GNSS position acquisition by a UE may take a relatively long time (e.g., 0.5 s to 2.0 or more seconds) compared to other wireless communication actions (e.g., 1 ms to 100 ms). Accordingly, in some instances the GNSS position acquisition gap may be less stringent than other timing indications. The GNSS position acquisition gap may be indicated based on a start time, an end time, and/or a length of time. The GNSS position acquisition gap may be indicated in terms of frame and/or subframe index and/or a common reference time (e.g., UTC). In some instances, the GNSS position acquisition gap may be indicated as a reference length (e.g., a reference frame and/or subframe, a reference range of frame(s) and/or subframe(s), a reference time, and/or a reference time range). In some instances, the length of the GNSS position acquisition gap may also include an associated offset. In this regard, the offset may provide some flexibility to the timing of the GNSS position acquisition gap relative to the reference length. For example, in some instances the UE may utilize time beyond the reference length of the GNSS position acquisition gap so long as the UE does not exceed the offset. The offset may be indicated in a similar and/or a different manner as the reference length (e.g., a number of frames and/or subframes, an offset frame and/or subframe, an offset range of frame(s) and/or subframe(s), an offset time, and/or an offset time range). In some instances, the reference length and/or the offset may be indicated based on a start time, an end time, and/or a length of time.

At block 1230, the UE performs, during the connected mode connection with the non-terrestrial network unit, a GNSS position acquisition during the GNSS position acquisition gap (see, e.g., FIGS. 6 and 7). In some instances, if the UE fails to successfully acquire GNSS positioning during the GNSS position acquisition gap, then the UE may operate in an idle mode and/or declare a radio link failure. In some instances, if the UE fails to successfully acquire GNSS positioning during the GNSS position acquisition gap, then the UE may initiate a further GNSS position acquisition. The further GNSS position acquisition may be based on a GNSS position recovery timer. For example, the UE may initially attempt to perform GNSS position acquisition in a the GNSS position acquisition gap as indicated by the non-terrestrial network unit at block 1220 and, if that fails, initiate the further GNSS position recovery procedure based on a GNSS position recovery timer (see, e.g., FIG. 7).

FIG. 13 is a flow diagram illustrating a wireless communication method 1300 according to one or more aspects of the present disclosure. Aspects of the method 1300 can be executed by a computing device (e.g., a processor, processing circuit, and/or other suitable component) of a wireless communication device or other suitable means for performing the blocks. For instance, the wireless communication device may include a network unit (e.g., network unit 900, BS 105, CU 210, DU 230, and/or RU 240). The non-terrestrial network unit 900 may utilize one or more components, such as the processor 902, the memory 904, the GNSS module 908, the transceiver 910, the modem subsystem 912, the RF unit 914, and/or the one or more antennas 916, to execute the blocks of method 1100. The method 1300 may employ similar mechanisms as described in FIGS. 3-7. As illustrated, the method 1300 includes a number of enumerated blocks, but aspects of the method 1300 may include additional blocks before, after, and in between the enumerated blocks. In some aspects, one or more of the enumerated blocks may be omitted or performed in a different order.

At block 1310, the non-terrestrial network unit (network unit 900, BS 105, CU 210, DU 230, and/or RU 240) establishes a connected mode connection with a user equipment (UE). In some instances, the non-terrestrial network unit may receive an indication of an initial GNSS position and/or a validity time associated with the initial GNSS position from the UE. In some aspects, the non-terrestrial network unit receives the indication of the initial GNSS position and/or the indication of the validity time associated with the initial GNSS position from the UE as part of establishing the connected mode connection with the UE.

At block 1320, the non-terrestrial network unit transmits, to the UE, an indication of a global navigation satellite system (GNSS) acquisition gap. The GNSS position acquisition gap may be configured to allow the UE to perform a GNSS position acquisition during the GNSS position acquisition gap during the connected mode connection. The non-terrestrial network unit may transmit the indication of the GNSS position acquisition gap via a radio resource control (RRC) message or other suitable message. The length of the GNSS position acquisition gap may be based at least in part on the capability of the UE. For example, in some instances the non-terrestrial network unit may determine the length of the GNSS position acquisition gap at least in part based on a GNSS position acquisition time of the UE. In some instances, the indication of the GNSS position acquisition gap includes an indication of a reference time duration (e.g., reference time 630) and an allowable offset (e.g., offset 635) relative to the reference time duration. In this regard, the GNSS position acquisition by a UE may take a relatively long time (e.g., 0.5 s to 2.0 or more seconds) compared to other wireless communication actions (e.g., 1 ms to 100 ms). Accordingly, in some instances the GNSS position acquisition gap may be less stringent than other timing indications. The GNSS position acquisition gap may be indicated based on a start time, an end time, and/or a length of time. The GNSS position acquisition gap may be indicated in terms of frame and/or subframe index and/or a common reference time (e.g., UTC). In some instances, the GNSS position acquisition gap may be indicated as a reference length (e.g., a reference frame and/or subframe, a reference range of frame(s) and/or subframe(s), a reference time, and/or a reference time range). In some instances, the length of the GNSS position acquisition gap may also include an associated offset. In this regard, the offset may provide some flexibility to the timing of the GNSS position acquisition gap relative to the reference length. For example, in some instances the UE may utilize time beyond the reference length of the GNSS position acquisition gap so long as the UE does not exceed the offset. The offset may be indicated in a similar and/or a different manner as the reference length (e.g., a number of frames and/or subframes, an offset frame and/or subframe, an offset range of frame(s) and/or subframe(s), an offset time, and/or an offset time range). In some instances, the reference length and/or the offset may be indicated based on a start time, an end time, and/or a length of time.

In some aspects, non-terrestrial network unit transmits, to the UE, an indication of a length of a GNSS position recovery timer. The GNSS position recovery timer may be configured for use with a GNSS position acquisition performed by the UE outside of the GNSS position acquisition gap. For example, in some instances the UE may initiate a GNSS position recovery procedure in response to failing to acquire a GNSS position during the GNSS position acquisition gap. The UE may utilize the GNSS position recovery timer in performing the GNSS position recovery procedure. In some aspects, the length of the GNSS position recovery timer may be based at least in part on the capability of the UE. For example, in some instances the non-terrestrial network unit may determine the length of the GNSS position recovery timer at least in part based on a GNSS position acquisition time of the UE.

Other aspects of the present disclosure include:

Clause 1. A method of wireless communication performed by a user equipment (UE), the method comprising:

transmitting, to a non-terrestrial network unit, a capability indication, the capability indication indicating the UE is capable of performing a global navigation satellite system (GNSS) acquisition during a connected mode connection;

receiving, from the non-terrestrial network unit, an indication of whether the non-terrestrial network unit will support the UE performing the GNSS position acquisition during the connected mode connection; and performing, based at least in part on the receiving the indication, the GNSS position acquisition during the connected mode connection with the non-terrestrial network unit.

Clause 2. The method of clause 1, wherein the receiving the indication of whether the non-terrestrial network unit will support the UE performing the GNSS position acquisition during the connected mode connection comprises:

receiving, from the non-terrestrial network unit, the indication indicating the non-terrestrial network unit will support the UE performing the GNSS position acquisition during the connected mode connection.

Clause 3. The method of clause 2, wherein the receiving the indication indicating the non-terrestrial network unit will support the UE performing the GNSS position acquisition during the connected mode connection comprises:

receiving the indication via at least one of:
a system information broadcast message; or
radio resource control (RRC) message.

Clause 4. receiving the indication indicating the non-terrestrial network unit will support the UE performing the GNSS position acquisition during the connected mode connection comprises:

receiving the indication via the system information broadcast message prior to establishing the connected mode connection with the non-terrestrial network unit.

Clause 5. The method of clause 3, receiving the indication indicating the non-terrestrial network unit will support the UE performing the GNSS position acquisition during the connected mode connection comprises: receiving the indication via the RRC message after establishing the connected mode connection with the non-terrestrial network unit.

Clause 6. The method of clause 2, wherein the indication indicating the non-terrestrial network unit will support the UE performing the GNSS position acquisition during the connected mode connection comprises:

receiving the indication indicating support of a time period associated with GNSS position recovery during a connected mode connection.

Clause 7. The method of clause 2, wherein the performing the GNSS position acquisition comprises:

acquiring an updated GNSS position.

Clause 8. The method of clause 7, wherein the performing the GNSS position acquisition comprises:

initiating the GNSS position acquisition based on an expiration of an initial GNSS validity associated with the connected mode connection.

Clause 9. The method of clause 7, further comprising:

receiving, from the non-terrestrial network unit, an indication of a length of a GNSS position recovery timer.

Clause 10. The method of clause 9, wherein the length of the GNSS position recovery timer is based at least in part on the capability indication.

Clause 11. The method of clause 9, wherein the performing the GNSS position acquisition comprises:

in response to failing to successfully acquire GNSS positioning before expiration of the GNSS position recovery timer, performing at least one of:
transitioning to an idle mode; or
declaring a radio link failure.

Clause 12. The method of clause 7, further comprising:

receiving, from the non-terrestrial network unit, an indication of a GNSS position acquisition gap; and
wherein the performing the GNSS position acquisition comprises:
initiating the GNSS position acquisition in response to failing to successfully acquire GNSS positioning during the GNSS position acquisition gap.

Clause 13. The method of clause 1, wherein the receiving the indication of whether the non-terrestrial network unit will support the UE performing the GNSS position acquisition during the connected mode connection comprises:

receiving, from the non-terrestrial network unit, the indication indicating the non-terrestrial network unit will not support the UE performing the GNSS position acquisition during the connected mode connection.

Clause 14. The method of clause 13, wherein:

the capability indication includes an indication of a GNSS position acquisition time associated with the UE; and the indication indicating the non-terrestrial network unit will not support the UE performing the GNSS position acquisition during the connected mode connection is based at least in part on the GNSS position acquisition time of the UE.

Clause 15. A method of wireless communication performed by a non-terrestrial network unit, the method comprising:

receiving, from a user equipment (UE), a capability indication, the capability indication indicating the UE is capable of performing a global navigation satellite system (GNSS) acquisition during a connected mode connection; and transmitting, to the UE, an indication of whether the non-terrestrial network unit will support the UE performing the GNSS position acquisition during the connected mode connection.

Clause 16. The method of clause 15, wherein the transmitting the indication of whether the non-terrestrial network unit will support the UE performing the GNSS position acquisition during the connected mode connection comprises:

transmitting, to the UE, the indication indicating the non-terrestrial network unit will support the UE performing the GNSS position acquisition during the connected mode connection.

Clause 17. The method of clause 16, wherein the transmitting the indication indicating the non-terrestrial network unit will support the UE performing the GNSS position acquisition during the connected mode connection comprises:

transmitting the indication via at least one of:

a system information broadcast message; or a radio resource control (RRC) message.

Clause 18. The method of clause 16, wherein the transmitting the indication indicating the non-terrestrial network unit will support the UE performing the GNSS position acquisition during the connected mode connection comprises:

transmitting the indication indicating use of a GNSS position recovery timer.

Clause 19. The method of clause 18, further comprising:

transmitting, to the UE, an indication of a length of a GNSS position recovery timer.

Clause 20. The method of clause 19, wherein the length of the GNSS position recovery timer is based on the capability indication.

Clause 21. The method of clause 16, further comprising:

transmitting, to the UE, an indication of a GNSS position acquisition gap.

Clause 22. The method of clause 15, wherein the transmitting the indication of whether the non-terrestrial network unit will support the UE performing the GNSS position acquisition during the connected mode connection comprises:

transmitting, to the UE, the indication indicating the non-terrestrial network unit will not support the UE performing the GNSS position acquisition during the connected mode connection.

Clause 23. The method of clause 22, wherein:

the capability indication includes an indication of a GNSS position acquisition time of the UE; and the indication indicating the non-terrestrial network unit will not support the UE performing the GNSS position acquisition during the connected mode connection is based on the GNSS position acquisition time of the UE.

Clause 24. A method of wireless communication performed by a user equipment (UE), the method comprising:

establishing a connected mode connection with a non-terrestrial network unit;

receiving, from the non-terrestrial network unit, an indication of a global navigation satellite system (GNSS) acquisition gap; and performing, during the connected mode connection with the non-terrestrial network unit, a GNSS position acquisition during the GNSS position acquisition gap.

Clause 25. The method of clause 24, wherein the indication of the GNSS position acquisition gap comprises an indication of a reference time duration and an allowable offset relative to the reference time duration.

Clause 26. The method of clause 24, wherein the receiving the indication of the GNSS position acquisition gap comprises:

receiving, from the non-terrestrial network unit, the indication of the GNSS position acquisition gap via a radio resource control (RRC) message.

Clause 27. The method of clause 24, wherein the performing the GNSS position acquisition comprises:

in response to failing to successfully acquire GNSS positioning during the GNSS position acquisition gap, operating in an idle mode.

Clause 28. The method of clause 24, wherein the performing the GNSS position acquisition comprises:

in response to failing to successfully acquire GNSS positioning during the GNSS position acquisition gap, declaring a radio link failure.

Clause 29. The method of clause 24, wherein the performing the GNSS position acquisition comprises:

in response to failing to successfully acquire GNSS positioning during the GNSS position acquisition gap, initiating a second GNSS position acquisition.

Clause 30. The method of clause 29, further comprising:

receiving, from the non-terrestrial network unit, an indication of a length of a GNSS position recovery timer; and wherein the second GNSS position acquisition is based on the length of the GNSS position recovery timer.

Clause 31. A method of wireless communication performed by a non-terrestrial network unit, the method comprising:

establishing a connected mode connection with a user equipment (UE); and transmitting, to the UE, an indication of a global navigation satellite system (GNSS) acquisition gap, the GNSS position acquisition gap configured to allow the UE to perform a GNSS position acquisition during the GNSS position acquisition gap during the connected mode connection.

Clause 32. The method of clause 31, wherein the indication of the GNSS position acquisition gap comprises an indication of a reference time duration and an allowable offset relative to the reference time duration.

Clause 33. The method of clause 31, wherein the transmitting the indication of the GNSS position acquisition gap comprises:

transmitting, to the UE, the indication of the GNSS position acquisition gap via a radio resource control (RRC) message.

Clause 34. The method of clause 31, further comprising:

transmitting, to the UE, an indication of a length of a GNSS position recovery timer, wherein the GNSS position recovery timer is configured for use with a GNSS position acquisition performed by the UE outside of the GNSS position acquisition gap.

Clause 35. A non-transitory computer-readable medium storing one or more instructions for wireless communication, the one or more instructions comprising one or more instructions that, when executed by one or more processors of a UE, cause the UE to perform any one of clauses 1-14.

Clause 36. A non-transitory computer-readable medium storing one or more instructions for wireless communication, the one or more instructions comprising one or more instructions that, when executed by one or more processors of a network unit, cause the non-terrestrial network unit to perform any one of aspects of aspects of clauses 15-23.

Clause 37. A non-transitory computer-readable medium storing one or more instructions for wireless communication, the one or more instructions comprising one or more instructions that, when executed by one or more processors of a UE, cause the UE to perform any one of clauses 24-30.

Clause 38. A non-transitory computer-readable medium storing one or more instructions for wireless communication, the one or more instructions comprising one or more instructions that, when executed by one or more processors of a network unit, cause the non-terrestrial network unit to perform any one of aspects of aspects of clauses 31-34.

Clause 39. A user equipment (UE) comprising one or more means to perform any one or more aspects of clauses 1-14.

Clause 40. A network unit comprising one or more means to perform any one or more aspects of clauses 15-23.

Clause 41. A user equipment (UE) comprising one or more means to perform any one or more aspects of clauses 24-30.

Clause 42. A network unit comprising one or more means to perform any one or more aspects of clauses 31-34.

Clause 43. A user equipment (UE) comprising: a memory; a transceiver; and at least one processor coupled to the memory and the transceiver, wherein the UE is configured to perform any one or more aspects of clauses 1-14.

Clause 44. A network unit comprising: a memory; a transceiver; and at least one processor coupled to the memory and the transceiver, wherein the non-terrestrial network unit is configured to perform any one or more aspects of clauses 14-23.

Clause 45. A user equipment (UE) comprising: a memory; a transceiver; and at least one processor coupled to the memory and the transceiver, wherein the UE is configured to perform any one or more aspects of clauses 24-30.

Clause 46. A network unit comprising: a memory; a transceiver; and at least one processor coupled to the memory and the transceiver, wherein the non-terrestrial network unit is configured to perform any one or more aspects of clauses 31-34.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. For instance, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for instance, a list of items prefaced by a phrase such as "at least one of" or "one or more of") indicates an inclusive list such that, for instance, a list of [at least one of A, B, or C] means A or B or C or AB or AC or BC or ABC (e.g., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some aspects thereof, but rather, should be fully commensurate with that of the claims appended hereafter and their functional equivalents.

What is claimed is:

1. A user equipment (UE), comprising:
at least one memory device;
at least one transceiver; and
at least one processor in communication with the at least one memory device and the at least one transceiver, the at least one memory device storing instructions which are executable by the at least one processor, individually or in any combination, to cause the UE to:
transmit, to a non-terrestrial network unit, a capability indication, the capability indication indicating the UE is capable of performing a global navigation satellite system (GNSS) position acquisition during a connected mode connection;
receive, via a system information broadcast message from the non-terrestrial network unit and prior to establishing the connected mode connection with the non-terrestrial network unit, an indication indicating the non-terrestrial network unit will support the UE performing the GNSS position acquisition during the connected mode connection; and
perform, based at least in part on the receiving the indication, the GNSS position acquisition during the connected mode connection with the non-terrestrial network unit.

2. The UE of claim 1, wherein the indication further indicates support of a time period associated with GNSS position recovery during the connected mode connection.

3. The UE of claim 1, wherein the UE performs the GNSS position acquisition to acquire an updated GNSS position.

4. The UE of claim 3, wherein the UE is further configured to:
initiate the GNSS position acquisition based on an expiration of an initial GNSS validity associated with the connected mode connection.

5. The UE of claim 3, wherein the UE is further configured to:

receiver, from the non-terrestrial network unit, an indication of a length of a GNSS position recovery timer.

6. The UE of claim 5, wherein the length of the GNSS position recovery timer is based at least in part on the capability indication.

7. The UE of claim 5, wherein the UE is further configured to:

in response to failing to successfully acquire GNSS positioning before expiration of the GNSS position recovery timer, perform at least one of:

transitioning to an idle mode; or declaring a radio link failure.

8. The UE of claim 3, wherein the UE is further configured to:

receive, from the non-terrestrial network unit, an indication of a GNSS position acquisition gap; and wherein the UE is configured to perform the GNSS position acquisition in part by:

initiating the GNSS position acquisition in response to failing to successfully acquire GNSS positioning during the GNSS position acquisition gap.

9. The UE of claim 1, wherein:

the capability indication includes an indication of a GNSS position acquisition time associated with the UE.

10. A user equipment (UE), comprising:

at least one memory device;

at least one transceiver; and at least one processor in communication with the at least one memory device and the at least one transceiver, the at least one memory device storing instructions which are executable by the at least one processor, individually or in any combination, to cause the UE to:

establish a connected mode connection with a non-terrestrial network unit;

receive, via a system information broadcast message from the non-terrestrial network unit and prior to establishing the connected mode connection with the non-terrestrial network unit, an indication of a global navigation satellite system (GNSS) position acquisition gap, the indication also indicating the non-terrestrial network unit will support the UE performing a GNSS position acquisition during the connected mode connection; and perform, during the connected mode connection with the non-terrestrial network unit, the GNSS position acquisition during the GNSS position acquisition gap.

11. The UE of claim 10, wherein the indication of the GNSS position acquisition gap comprises an indication of a reference time duration and an allowable offset relative to the reference time duration.

12. The UE of claim 10, wherein the UE is further configured to:

in response to failing to successfully acquire GNSS positioning during the GNSS position acquisition gap, operate in an idle mode.

13. The UE of claim 10, wherein the UE is further configured to:

in response to failing to successfully acquire GNSS positioning during the GNSS position acquisition gap, declare a radio link failure.

14. The UE of claim 10, wherein the UE is further configured to:

in response to failing to successfully acquire GNSS positioning during the GNSS position acquisition gap, initiate a second GNSS position acquisition.

15. The UE of claim 14, further comprising:

receiving, from the non-terrestrial network unit, an indication of a length of a GNSS position recovery timer; and wherein the second GNSS position acquisition is based on the length of the GNSS position recovery timer.

16. A method of wireless communication performed by a user equipment (UE), the method comprising:

transmitting, to a non-terrestrial network unit, a capability indication, the capability indication indicating the UE is capable of performing a global navigation satellite system (GNSS) position acquisition during a connected mode connection;

receiving, via a system information broadcast message from the non-terrestrial network unit and prior to establishing the connected mode connection with the non-terrestrial network unit, an indication indicating the non-terrestrial network unit will support the UE performing the GNSS position acquisition during the connected mode connection; and performing, based at least in part on the receiving the indication, the GNSS position acquisition during the connected mode connection with the non-terrestrial network unit.

17. The method of claim 16, wherein the receiving the indication indicating the non-terrestrial network unit will support the UE performing the GNSS position acquisition during the connected mode connection comprises:

receiving the indication indicating support of a time period associated with GNSS position recovery during the connected mode connection.

18. The method of claim 16, wherein the performing the GNSS position acquisition comprises:

acquiring an updated GNSS position.

19. The method of claim 16, wherein the performing the GNSS position acquisition comprises:

initiating the GNSS position acquisition based on an expiration of an initial GNSS validity associated with the connected mode connection.

20. The method of claim 16, further comprising:

receiving, from the non-terrestrial network unit, an indication of a length of a GNSS position recovery timer.

21. The method of claim 20, further comprising:

in response to failing to successfully acquire GNSS positioning before expiration of the GNSS position recovery timer, performing at least one of:

transitioning to an idle mode; or declaring a radio link failure.

22. The method of claim 16, further comprising:

receiving, from the non-terrestrial network unit, an indication of a GNSS position acquisition gap; and wherein the performing the GNSS position acquisition comprises:

initiating the GNSS position acquisition in response to failing to successfully acquire GNSS positioning during the GNSS position acquisition gap.

* * * * *